Figure 1:
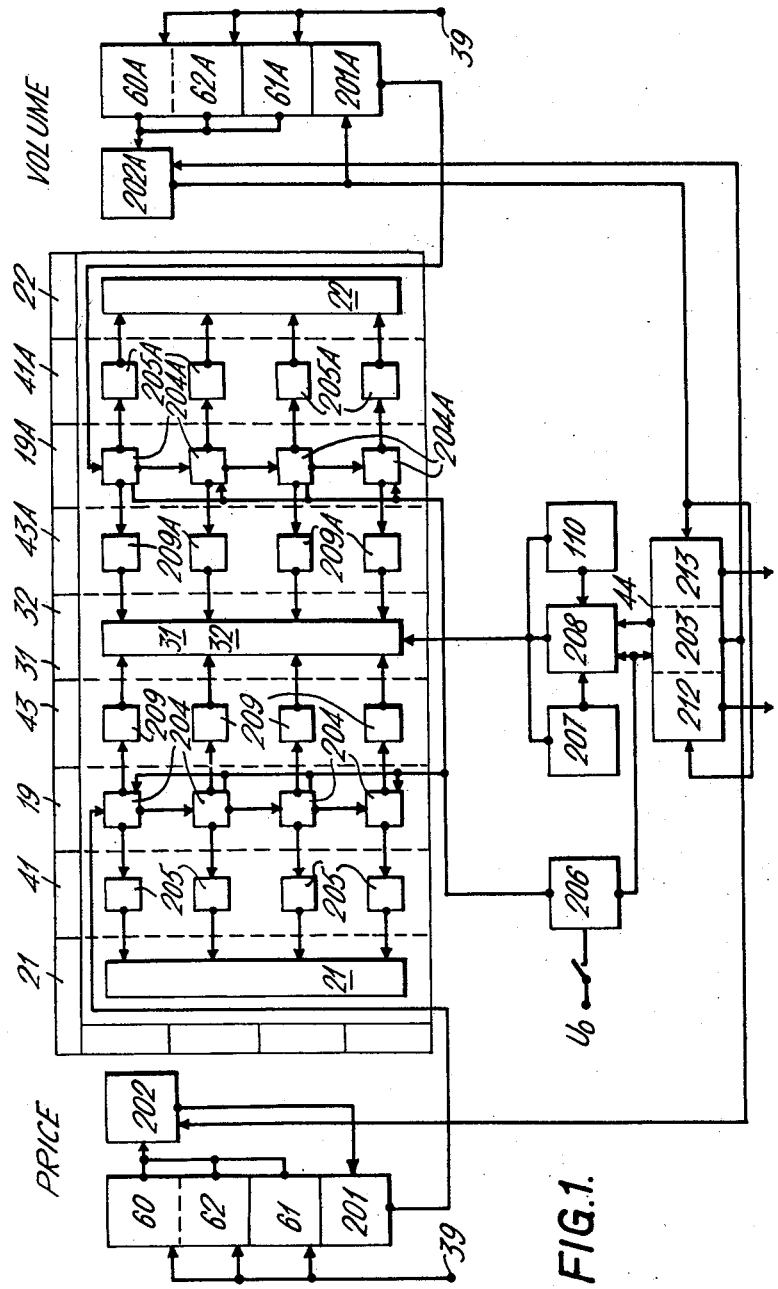
Figure 4B:
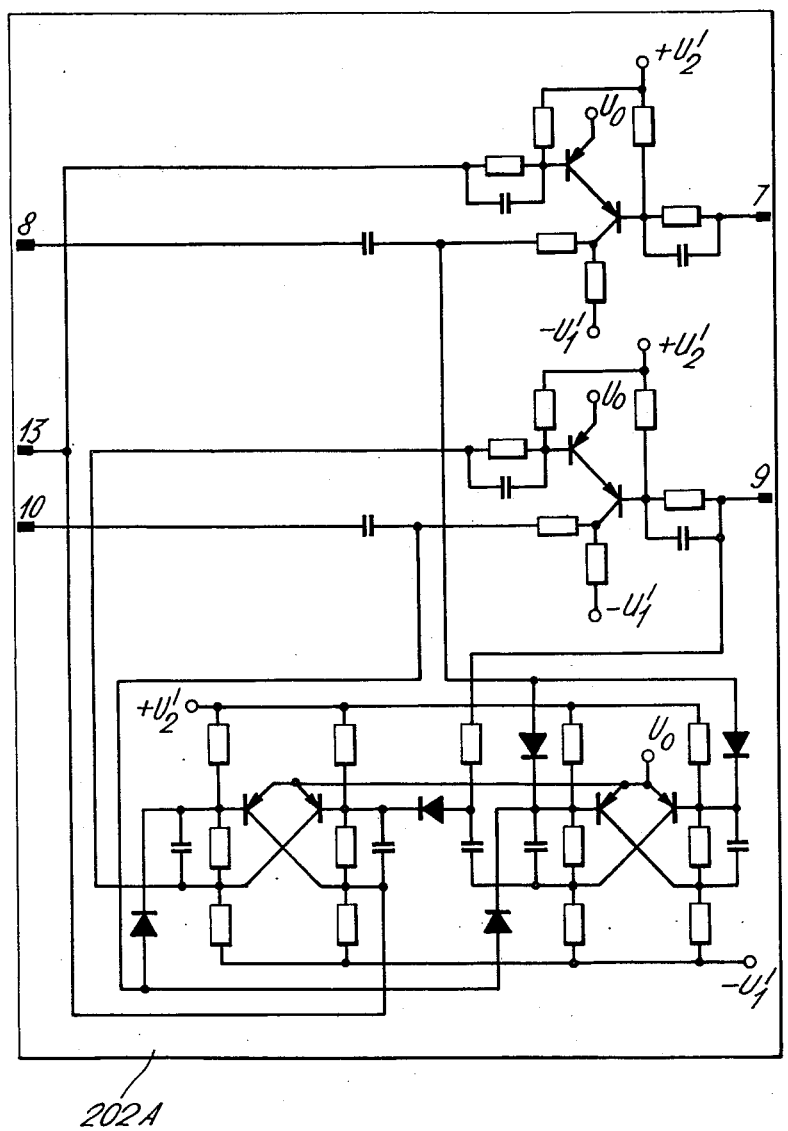
Figure 7:
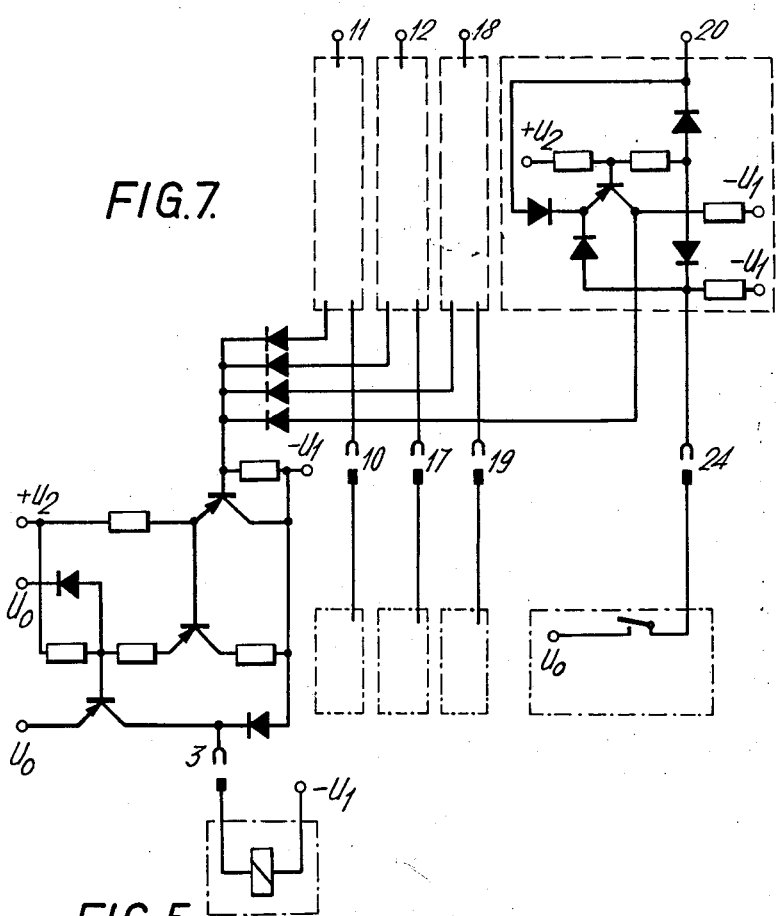

April 28, 1964   R. M. PHILLIPS ETAL   3,130,869
METERING SYSTEM
Filed March 30, 1961                    22 Sheets-Sheet 1

INVENTORS
RICHARD MORRISON PHILLIPS
DAVID JOHN LINDSAY-SCOTT
BY Morgan, Finnegan, Durham & Pine
ATTORNEYS April 28, 1964  R. M. PHILLIPS ETAL  3,130,869
METERING SYSTEM
Filed March 30, 1961  22 Sheets-Sheet 2
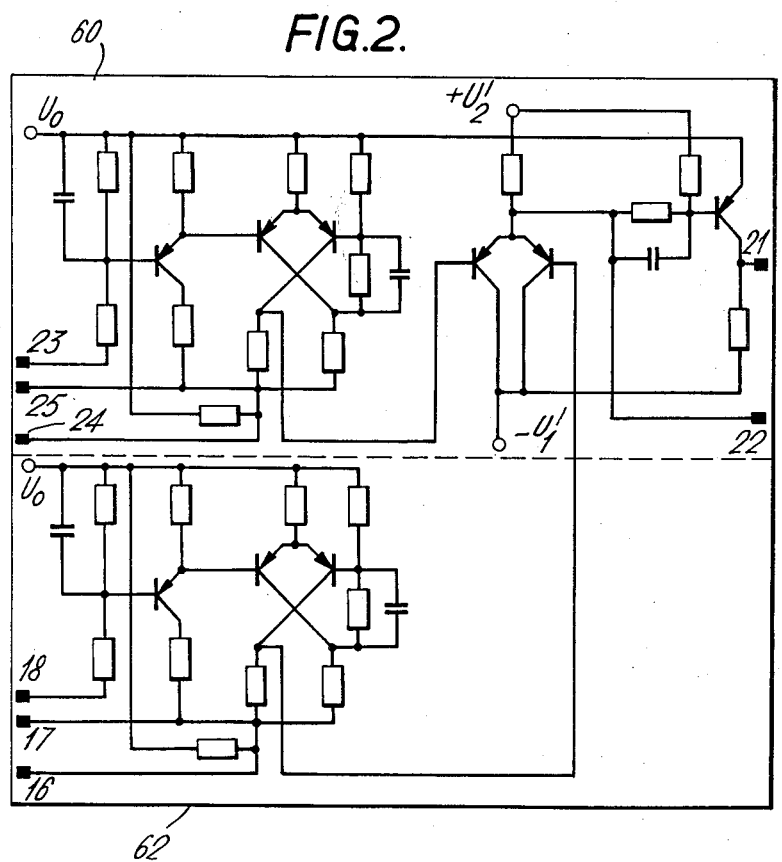
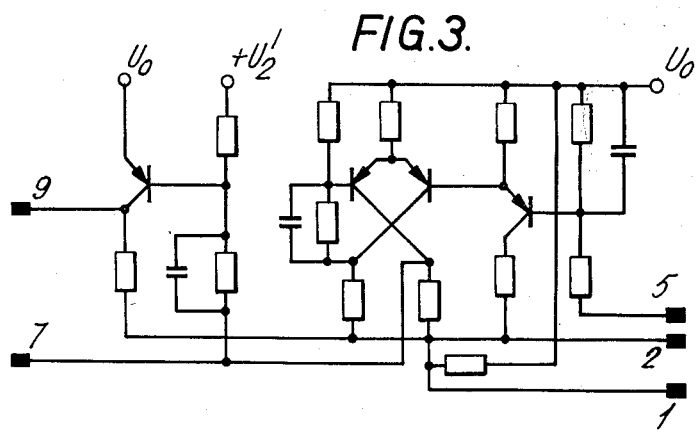
INVENTORS
RICHARD MORRISON PHILLIPS
DAVID JOHN LINDSAY-SCOTT
BY Morgan, Finnegan, Durham & Pine
ATTORNEYS

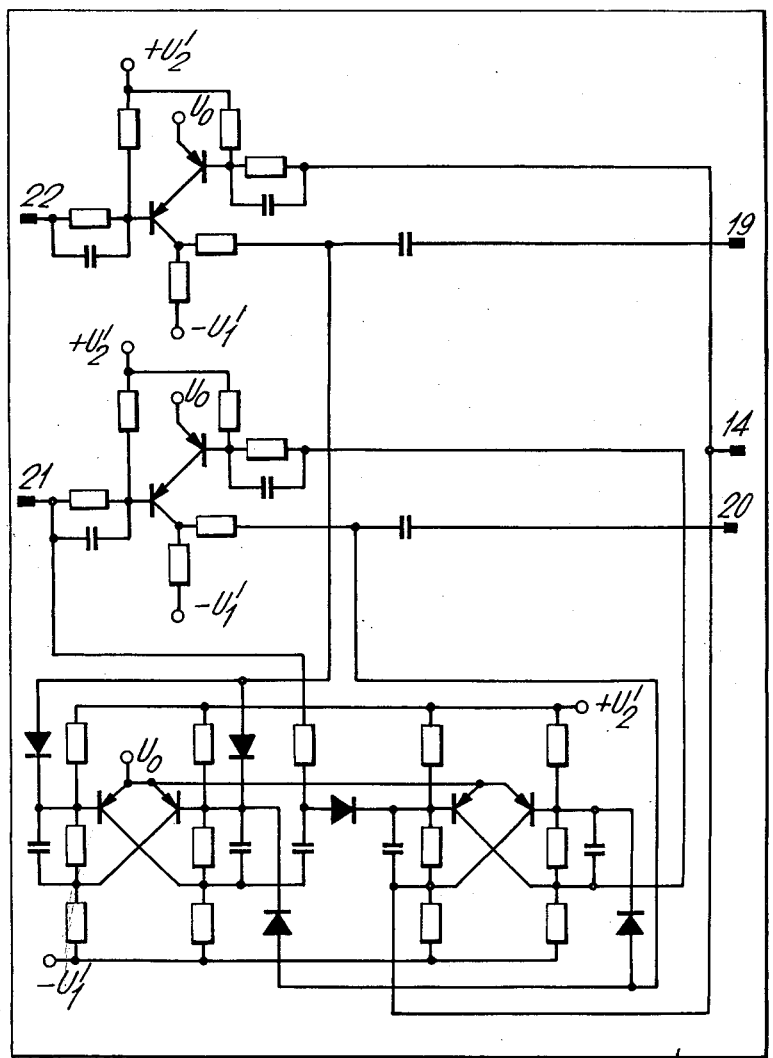

INVENTORS
RICHARD MORRISON PHILLIPS
DAVID JOHN LINDSAY-SCOTT
BY Morgan, Finnegan, Durham & Pine
ATTORNEYS INVENTORS
RICHARD MORRISON PHILLIPS
DAVID JOHN LINDSAY-SCOTT
BY Morgan, Finnegan, Durham & Pine
ATTORNEYS

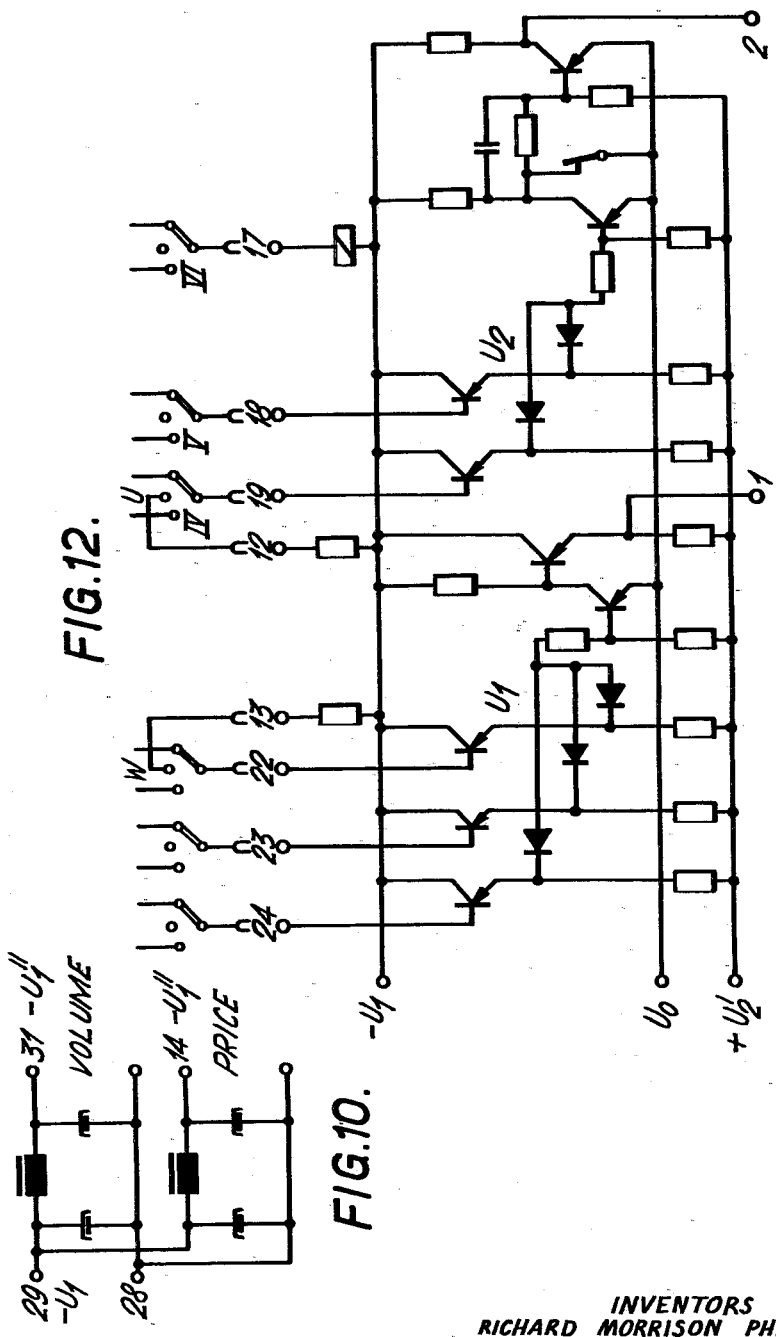

April 28, 1964  R. M. PHILLIPS ETAL  3,130,869
METERING SYSTEM
Filed March 30, 1961  22 Sheets-Sheet 10
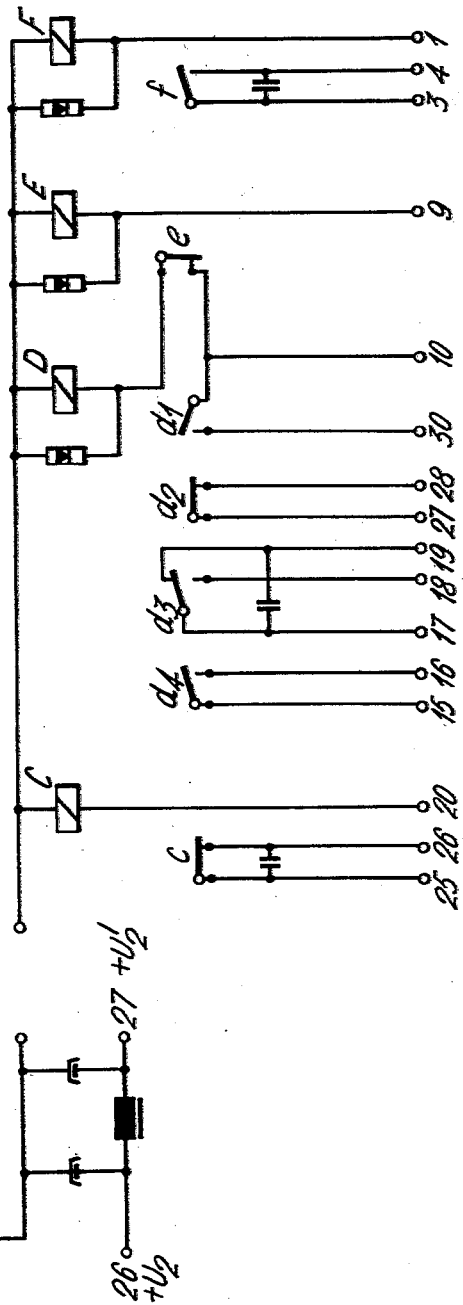
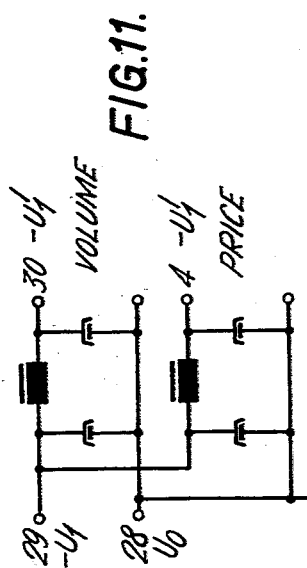
INVENTORS
RICHARD MORRISON PHILLIPS
DAVID JOHN LINDSAY-SCOTT
BY Morgan, Finnegan, Durham & Pine
ATTORNEYS

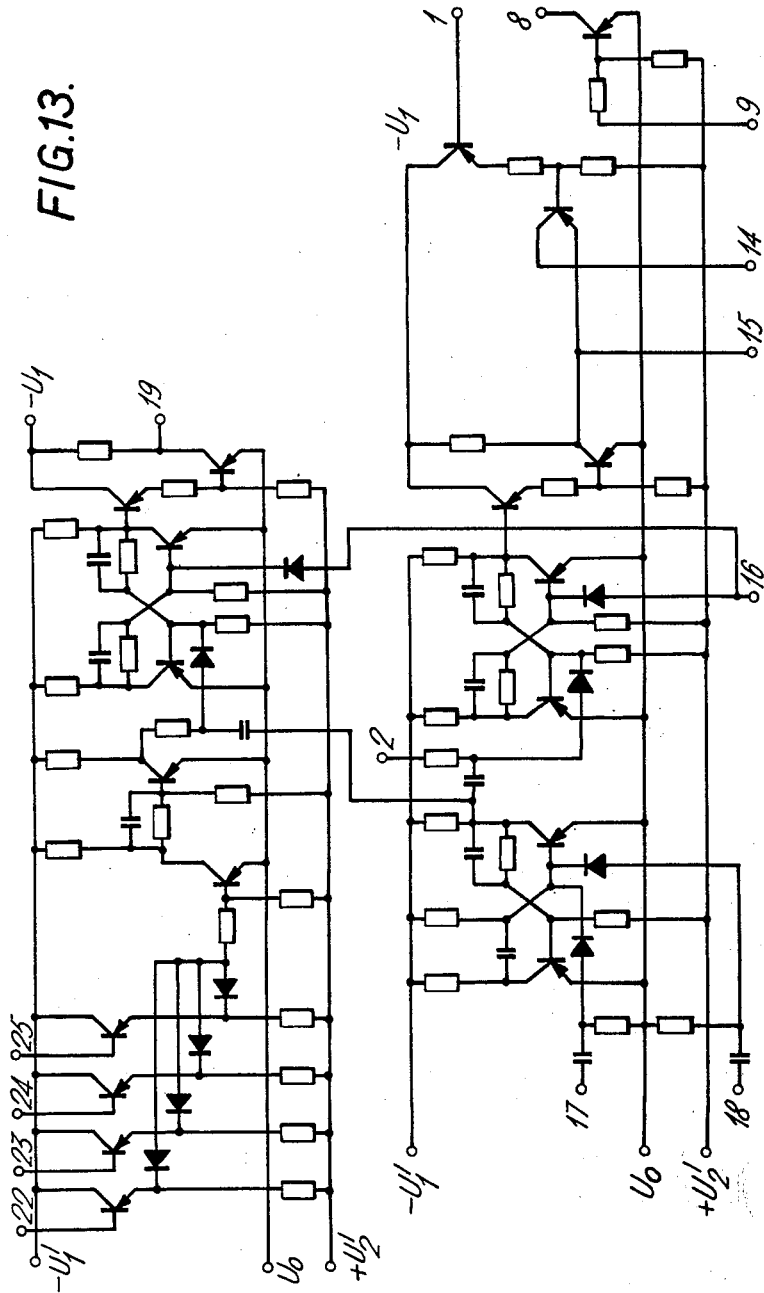

INVENTORS
RICHARD MORRISON PHILLIPS
DAVID JOHN LINDSAY-SCOTT
BY *Morgan, Finnegan, Durham & Pine*
ATTORNEYS

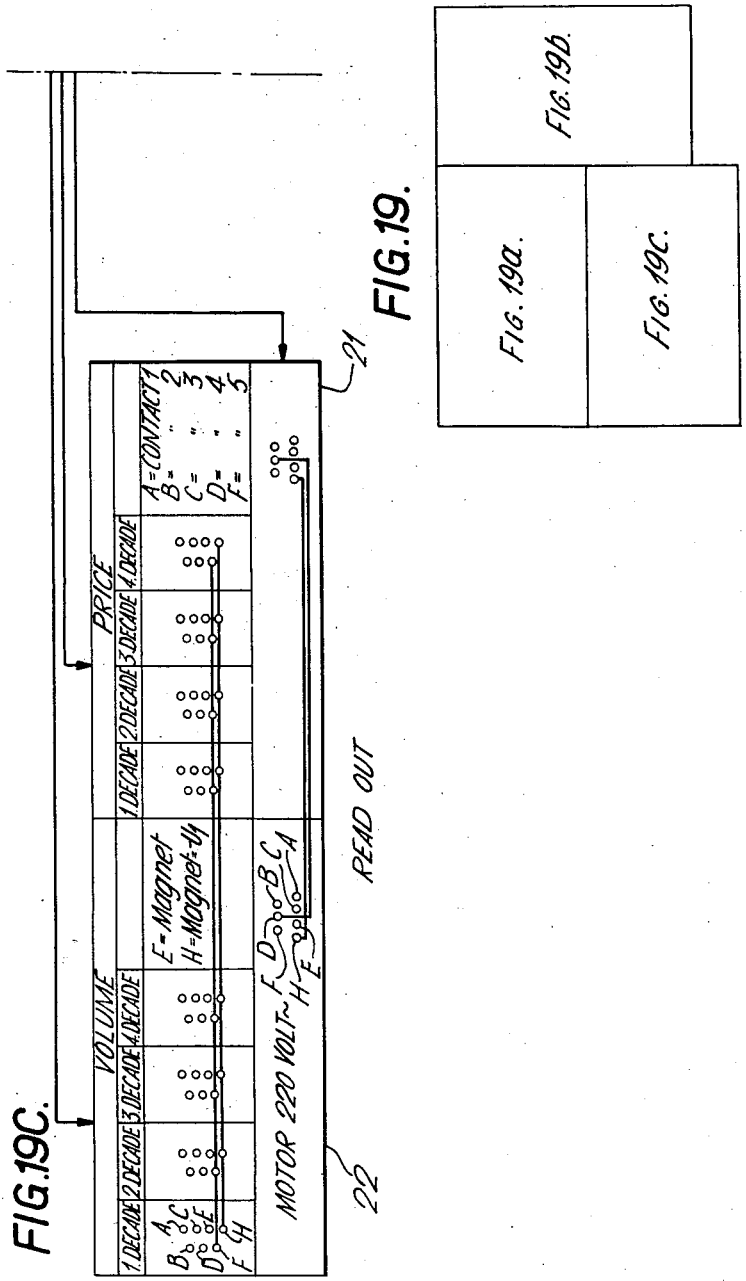

April 28, 1964 R. M. PHILLIPS ETAL 3,130,869
METERING SYSTEM
Filed March 30, 1961 22 Sheets-Sheet 17
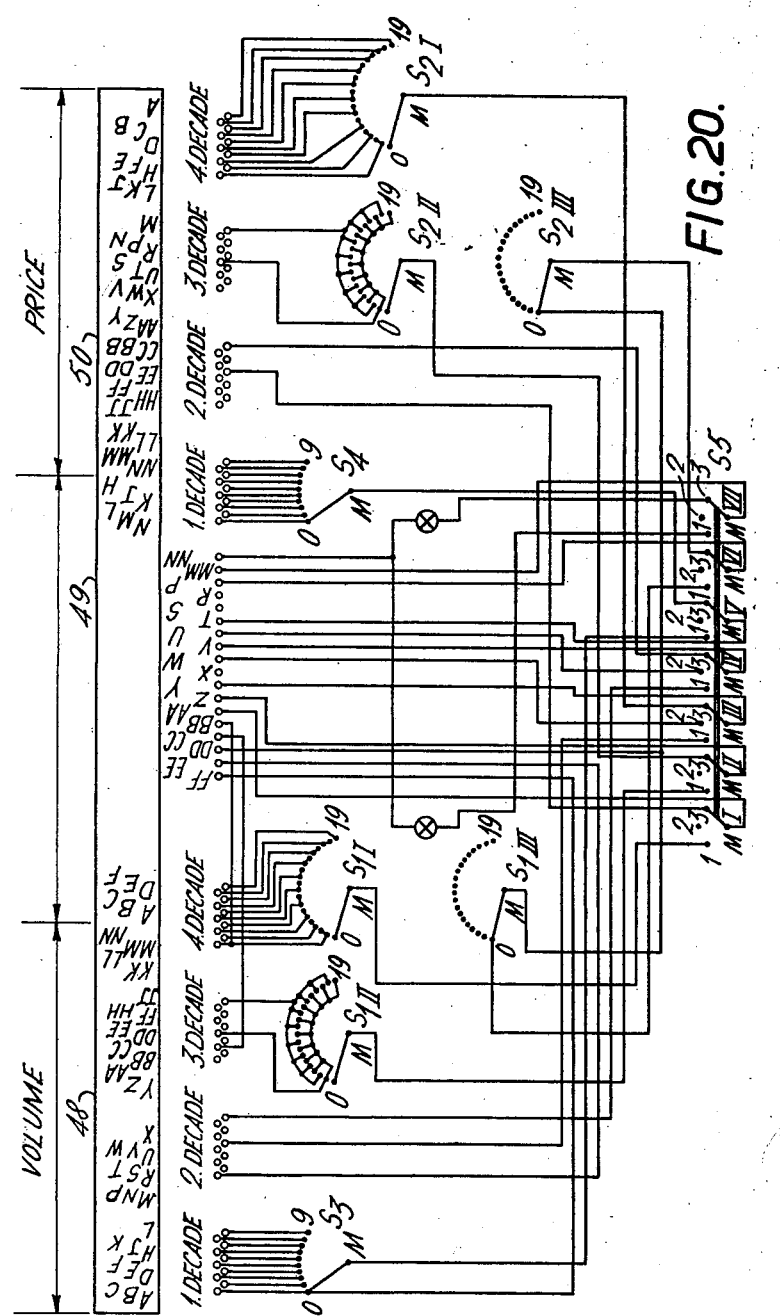
INVENTORS
RICHARD MORRISON PHILLIPS
DAVID JOHN LINDSAY-SCOTT
BY Morgan, Finnegan, Durham & Pine
ATTORNEYS April 28, 1964   R. M. PHILLIPS ETAL   3,130,869
METERING SYSTEM Filed March 30, 1961   22 Sheets—Sheet 20

INVENTORS
RICHARD MORRISON PHILLIPS
DAVID JOHN LINDSAY-SCOTT
BY Morgan, Finnegan, Durham & Pine
ATTORNEYS INVENTORS
RICHARD MORRISON PHILLIPS
DAVID JOHN LINDSAY-SCOTT
BY Morgan, Finnegan, Durham & Pine
ATTORNEYS United States Patent Office 3,130,869
Patented Apr. 28, 1964

3,130,869
METERING SYSTEM
Richard Morrison Phillips and David John Lindsay-Scott, London, England, assignors to The British Petroleum Company Limited, London, England, and The de Havilland Engine Company Limited, Leavesden, Hertfordshire, England, both British joint-stock corporations
Filed Mar. 30, 1961, Ser. No. 99,417
Claims priority, application Great Britain Apr. 11, 1960
12 Claims. (Cl. 222—26)

This invention relates to an improved metering system.

According to this invention there is provided a metering system comprising two meters, each adapted to measure a property of a different body of material and each connected to an electric signal transmitter giving a signal characteristic of the property measured, the system also comprising an electrical unit receiving the signals and giving an output signal which is a pre-determined function of the two input signals.

The output signal may be, for example, characteristic of (a) the sum of the values of the properties measured.
(b) the ratio of the values of the properties measured.
(c) the algebraic difference between the ratio of the values of the properties measured and a predetermined value.
(d) the point in time when the integral with respect to time of either of the values of the properties reaches a predetermined value.

According to one aspect of this invention there is provided a fluid blending system comprising two meters, each meter (a) being adapted for use in association with a fluid stream to measure a property of the stream or of the material of the stream and (b) when in use being in association with a different fluid stream and (c) being connected to an electrical signal transmitter whereby there is provided a signal train, the signal, which is either recurring or continuous, or the signal interval at given time being characteristic of the property measured by the meter; said system also comprising an electrical circuit adapted to receive simultaneously a signal train derived from each of the transmitters and adapted to provide an output electrical signal when the ratio of the values of the properties measured by the meters differs from a pre-determined ratio; said system also comprising an electro-mechanically operated flow control unit, adapted to be connected into one or other or both of the fluid streams and adapted to respond to signals derived from said electrical circuit to maintain the ratio of the values of the properties as measured by the meters at said pre-determined ratio.

According to another aspect of this invention there is provided a fluid blending system comprising two meters, each meter (a) being adapted for use in association with a fluid stream to measure a property of the stream or of the material of the stream and (b) when in use being in association with a different fluid stream and (c) being connected to an electrical signal transmitter whereby there is provided a signal train, the signal train overall being characteristic of the integral of the property measured, said integral being taken over a period of operation of the meter; said system also comprising an electrical circuit adapted to receive simultaneously a signal train derived from each of the transmitters and adapted to provide an output electrical signal when the ratio of the integrals of the values of the properties measured by the meters differs from a pre-determined ratio; said system also comprising an electro-mechanically operated flow control unit, adapted to be connected into one or other or both of the fluid streams and adapted to respond to signals derived from said electrical circuit to maintain the ratio of the integrals of the values of the properties as measured by the meters at said pre-determined ratio.

Preferably the signal train provided by each electrical signal transmitter is a pulse train. Preferably the pulse train is subjected electronically to pulse shaping to derive a modified pulse signal of rectangular wave form.

Preferably the output signal train provided by the electrical circuit consists of a pair of pulse trains in two output channels.

Although this is not essential, in general each meter will be adapted to measure the same property. Properties so measured may be (a) inherent properties of the material constituting the stream for example specific gravity, viscosity, specific thermal or electrical conductivity or color (b) extrinsic properties of the material, for example temperature and available heat and (c) properties of the stream, for example pressure, flow rate, linear velocity and quantity. The invention will hereinafter be described with reference to a system for metering based on measurement of quantity, this, however, is merely illustrative and the invention is not limited to this type of system.

According to this aspect of the invention there is provided a fluid blending system comprising two meters, each meter (a) being adapted for use in a fluid stream and being responsive to the quantity of fluid passing in association with the meter or to the flow rate of fluid passing in association with the meter, (b) being in use, connected to a different fluid stream and (c) being connected to an electrical signal transmitter whereby there is provided a signal train, the signals being recurring or continuous, the signal or signal interval at given time being characteristic of said flow rate; said system also comprising a circuit hereinafter referred to as the "balance circuit" adapted to receive, simultaneously, from each electrical signal transmitter the signal train or a modified signal train, derived from the initial signal train, and adapted to provide an output signal or signal train when the ratio of the values of flow rate, as measured by the meters differs from a pre-determined ratio; said system also comprising an electro-mechanically operated flow control unit, adapted to be connected into one or other or both of the fluid streams and adapted to respond to signals derived from said electrical circuit to maintain the ratio of the flow rates at said pre-determined ratio.

Preferably each meter will measure the passage of unit quantity of fluid as a pre-determined angle of rotation of an output shaft. The meter may be of any type by which this effect is achieved. Preferably the meter is in the form of a power driven positive displacement pump whereby the fluid stream is both brought into motion or assisted in motion and is metered.

Preferably the transmitter is adapted for operation by a rotating shaft and is adapted to generate a pulse train wherein each pulse corresponds to a pre-determined angle of rotation of the shaft; in association with the preferred type of meter described hereinbefore, the passage of unit quantity of fluid will give rise to one pulse. Preferred transmitters are as described in our co-pending British patent applications Nos. 19859/59 or 36192/59 and 12789/60 (cognate). Preferably each of the two pulse trains is converted by an electrical circuit into a continuous signal of variable current strength.

Preferably the balance circuit comprises a potentiometer fed by two continuous input signal trains, one at each end, one signal train and also the take-off from the movable contact of the potentiometer being fed to a differential electro-magnetic device by means of which, according to the relative strengths of current of the two trains fed to said device a signal or train of signals in one or other of two output channels is caused. Suitably one differential relay solenoid is connected to one input signal train, the other differential solenoid being fed by the potentiometer take-off. The differential solenoids operate a single relay arm which is employed to switch in one or other of two circuits carrying the output signals according to variations in the ratio of the strengths of the input signals and the ratio setting of the potentiometer contact.

Preferably the flow control unit is a pair of ganged valves, as described in our copending British patent application 12790/60.

According to a preferred system in accordance with this invention there is incorporated a metering system as described in our copending British patent application 12786/60. It will be apparent that the meters and transmitters will serve both the balance circuit and the hereinbefore described electrical summating unit, described in British patent application 12786/60.

The blending system of this invention is particularly suitable for use in a liquid product dispensing system, for example, a petrol dispensing system for use in the sale of petrol for use in automobiles. The dispensing system will be adapted for the dispensing of blends of liquid products and by means of a blending system as hereinbefore described, blends of petrol of the desired octane number, between the values of octane number of two fuels being blended, may be supplied. If desired, more than two fuels may be made available, separate meters and associated transmitters being employed for each fuel and a switch and valve system employed to permit the selection of any desired blend of two components.

Suitable electrical transmitters for use in the present invention are as follows. In each case the transmitter will be operated in response to the movement of a rotating shaft.

In one system, each transmitter drive shaft carries a cam or one or more arms which make and break an electrical circuit to give any predetermined number of pulses per revolution.

If desired, there may be used an electrical pulse generator element consisting of at least two endless tracks, each track being adapted to operate in conjunction with a follower and to give rise to a pulse signal when relative movement takes place between the track and an associated follower, at least two followers being provided whereby, in use, at least two pulse signals are derived simultaneously.

According to a modification of the transmitter last described, the pulse generator element will comprise an endless track, adapted to operate in conjunction with a follower and to give rise to a pulse signal, and a set of units consisting of at least two units, each unit bearing at least one endless track, as hereinbefore described, and being adapted for attachment to the element in such manner that, in use, the tracks of the element and unit attached thereto constitute a source of two trains of pulse signals having a fixed ratio of pulses per unit time, said ratio being of a value which is variable by the use of a different unit of said set.

With reference to the transmitters, having tracks as hereinbefore described, each or any of the tracks may consist of alternate sections of electrically conducting and non-conducting material; the track will be used in conjunction with a follower consisting of an electrical contact whereby a pulse train is constituted when relative movement takes place between the track and follower. Usually all conducting sections of a given track will be electrically connected; if desired, current may be passed to and/or from these sections by means of a second contact in continuous connection with a conducting track.

In accordance with another form of construction the track may be shaped to impart mechanical movement to a follower, for example a stylus, and this movement employed to generate a pulse train in any suitable manner, for example by using techniques well-known in the construction and performance of phonographic pick-up units.

If desired a track consisting of alternate hills and valleys may be employed as a cam surface to effect the alternate opening and closing of a pair of contact points.

In accordance with another form of construction, each or any of the tracks may consist of alternate sections of differing ability for modifying a beam of light; this track, hereinafter referred to as a "light regulating track," will be used in conjunction with a follower consisting of a photoelectric device, for example, a photoelectric cell or a transistor, capable, under the action of a beam of light of variable strength of initiating, or of modifying the strength of an electric current. Preferably, the alternate sections will be opaque and non-opaque; preferably the non-opaque sections will be transparent. If desired, reflecting sections, for example, mirror sections may be alternated with non-reflecting sections. In use, the track will be illuminated, preferably by a directed beam of light, and the photo-electric device will be situated to receive light alternately of relatively high and low intensity as the different sections of the track in turn modify the light received from the initial source. Separate light sources may be employed for each track or a single light source may be employed for a number of tracks.

Suitably, according to the aspect of the invention last described, the track will be formed of an opaque material having perforations therein or having irregularities, for example, notches, along an edge, which constitute the non-opaque sections. Alternatively, the track may consist of a translucent or transparent material having relatively dark sections superimposed. Thus the track may be formed of photographic material, suitably processed.

Suitably, according to any of systems described hereinbefore each track constitutes a ring upon the surface of a disc. If desired one track only may be provided on each disc and one or more discs mounted on a common axle. If desired one disc may be fixed to the axle and the other discs constitute a set from which a required disc may be selected and temporarily secured upon said axle. Alternatively, a plurality of tracks or all of the tracks may constitute a system of concentric rings upon a single disc. One or more followers may be adapted for movement, at the control of the operator, from one track to another; if desired each track may have its own follower and the required pulse trains selected by use of a mechanical or electrical switching system.

As a modification to the system described, the disc or discs may be replaced by (a) a cylindrical surface, or surfaces, upon which is or are carried the endless tracks or (b) an endless band or bands carrying the endless tracks.

While the apparatus may be designed for use with moving followers and stationary tracks, it will usually be found preferable to maintain the followers stationary and to employ rotating discs, cylinders or bands.

It will be apparent that a rotating shaft may be employed to drive a pulse generator, comprising a generator element in accordance with the invention, whereby there is obtained two pulse trains. In each pulse train, the number of pulses per unit time will be variable, being a fixed number of pulses per shaft revolution, and thus dependent upon rate of revolution of the shaft. However, irrespective of the rate of revolution of the shaft, the ratio of the number of pulses per unit time in the two pulse trains will be constant; similarly the ratio of total number of pulses in the two pulse trains for a given number of revolutions of the shaft will be constant. However, by exchanging one of the tracks for a further track having different pulse generating characteristics, said ratio of the number of pulses per unit time (and said ratio of total number of pulses) will be changed to a new value.

According to another aspect of this invention there is provided a liquid product supply system comprising a blending system as hereinbefore described, a read-out system, and a set of storage tanks, each tank being provided to contain a different liquid product and having associated therewith a pump, a meter having a mechanical output responsive to the quantity of product passed therethrough and a transmitter mechanically driven by the meter and adapted to transmit monitoring electrical signals, in response to the mechanical output of the meter, to the actuating mechanism of the blending system.

It will be understood that in the simplest case a "set" of storage tanks consists of two tanks. Thus, for example, as applied to the sale of motor fuel, a selection may be given between regular and premium grades.

In a liquid product supply system, according to this invention, for dispensing fuel to vehicles it is preferred that storage tanks, pumps and meters be located below ground level, as hereinafter defined and the read-out system be located above ground level, as hereinafter defined.

By "ground level" we mean the level of the area within which vehicles would stand while being supplied from the system of this invention.

Suitably, in a system according to this invention for use in dispensing fuel to vehicles, the read-out system is portable. Thus a small portable read-out unit, connected to the remainder of the system by a flexible electrical lead, may be set up by the operator within view from the driving position of a vehicle to which fuel is to be supplied.

Suitably two read-out systems will be employed simultaneously for a given sale, these systems being adapted to operate electrically in parallel, one system being a fixed unit, located to provide indication to the operator of the quantity of fuel dispensed to a vehicle and a second system being a portable unit and adapted for location to provide indication at the driving position of said vehicle of said quantity.

Preferred read-out systems are as described in our copending British patent application No. 21860/60 or in German Patent application No. 630827 IX 42p.

It will be understood that in accordance with this invention a plurality of dispensing positions, each equipped with a blending system and set of supply hoses, may be operated using a single storage tank and pump for each different liquid material dispensed. A separate meter may be provided in association with each supply hose; alternatively, a single meter may be provided for each liquid material dispensed and an electrical selection system provided to enable only one dispensing position to be supplied through a given meter at given time. It will be apparent that, if desired, a compromise may be effected between these alternatives wherein, for operating convenience, certain dispensing positions share the use of a given meter.

It will be understood that the liquid product supply system according to this invention may compromise also conventional ancillary equipment, for example filters, air-separators, totalizers, supply hoses and supply nozzles.

It is believed that by the use of a liquid product supply system according to this invention it may prove possible to obtain substantial advantages in roadside fuelling service, for example by:

(1) Reducing the number of curbside pumps which are necessary to supply products to provide standby equipment.

(2) Providing more room on the sales "island."

(3) Reducing the area required as standing space for vehicles since all products may be made available at one fuelling position. Thus at present time, by way of contrast, the sale of five products at five curbside pumps necessitates an "island" length of 15 feet. Furthermore:

(4) The indicator head may be self containing except for quick acting electrical connections and one actuating lever to operate the trigger nozzle locking device; in the event of this piece of equipment breaking down its replacement by a spare (which could be held at each station) would require only a few minutes of an operator's time and would not require skilled fitting.

Figure 18:
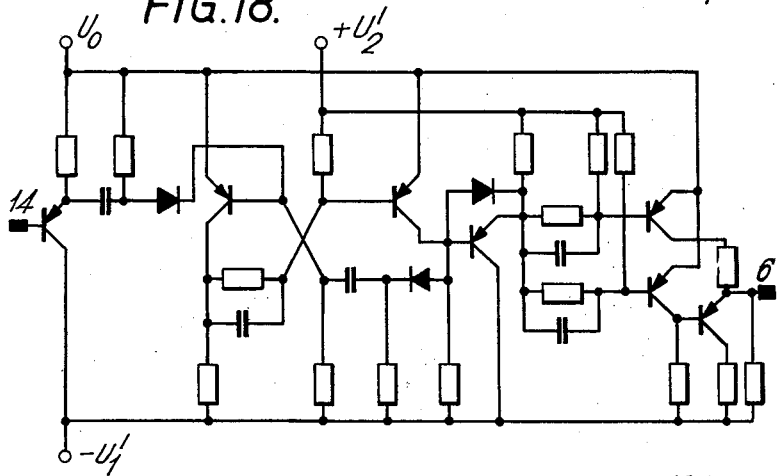
Figure 19A:
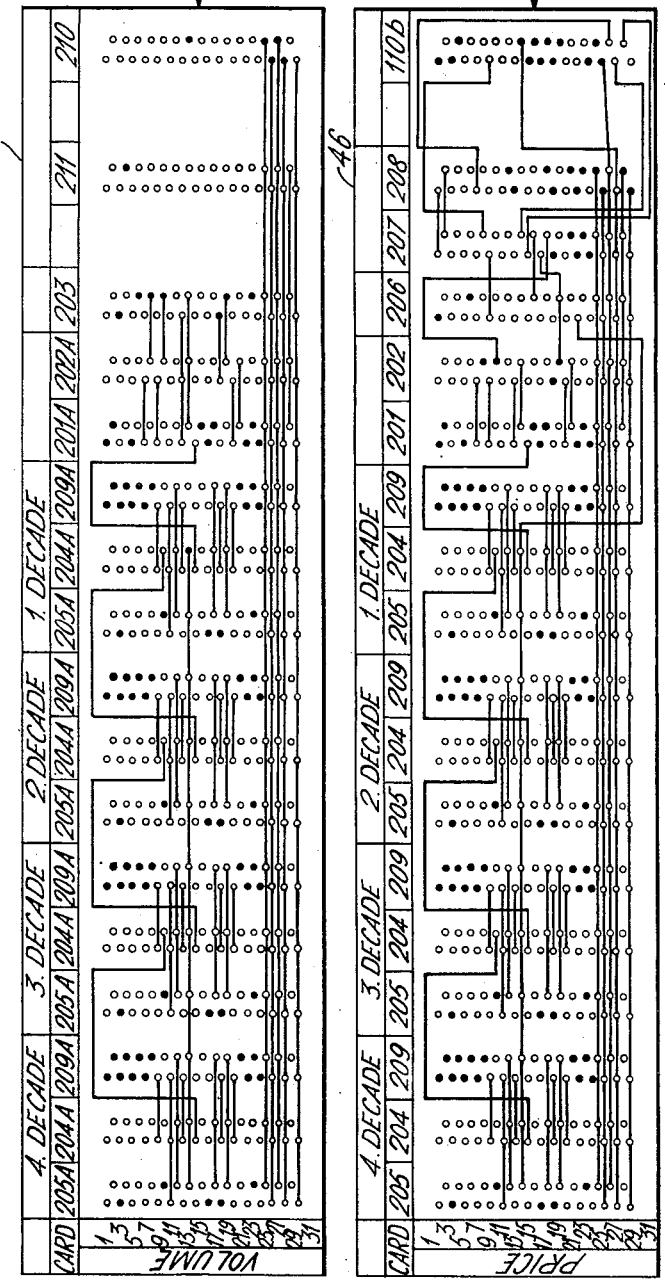
Figure 19B:
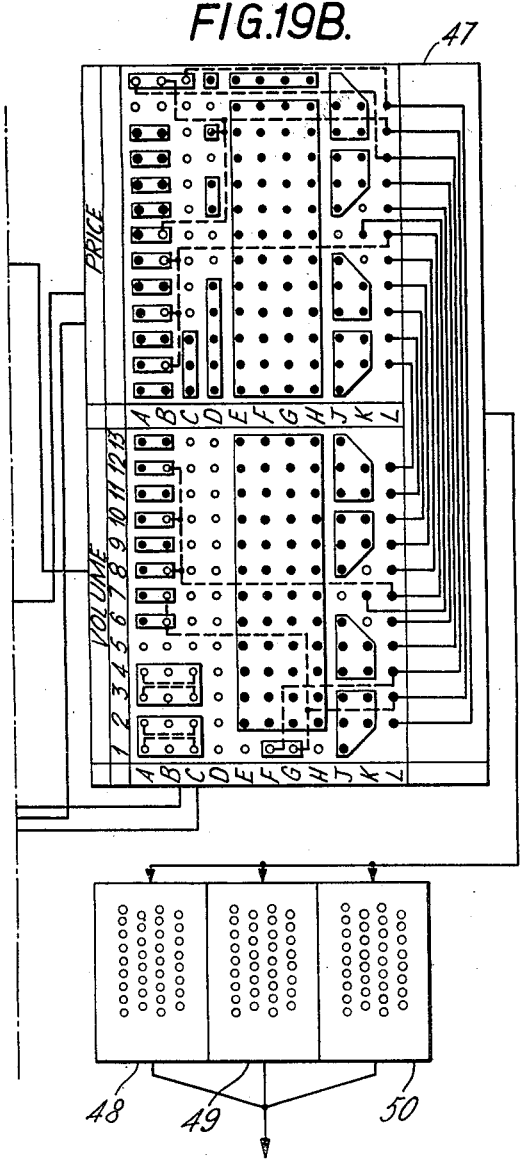
Figure 21:
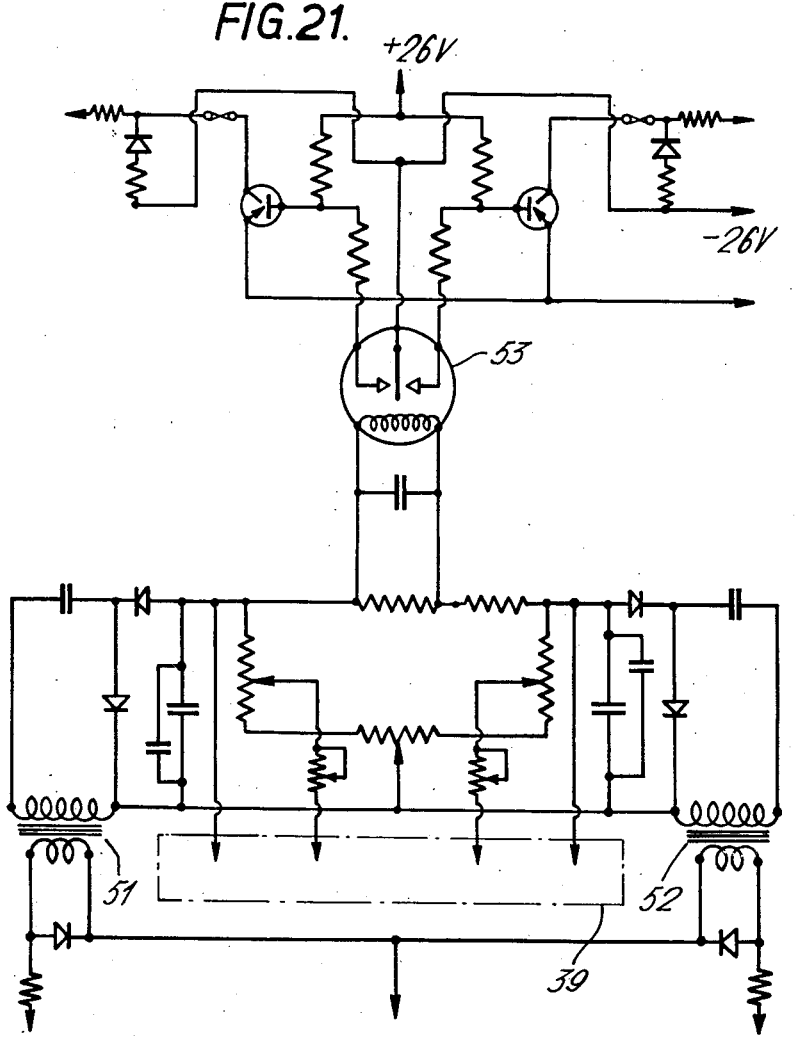
Figure 22:
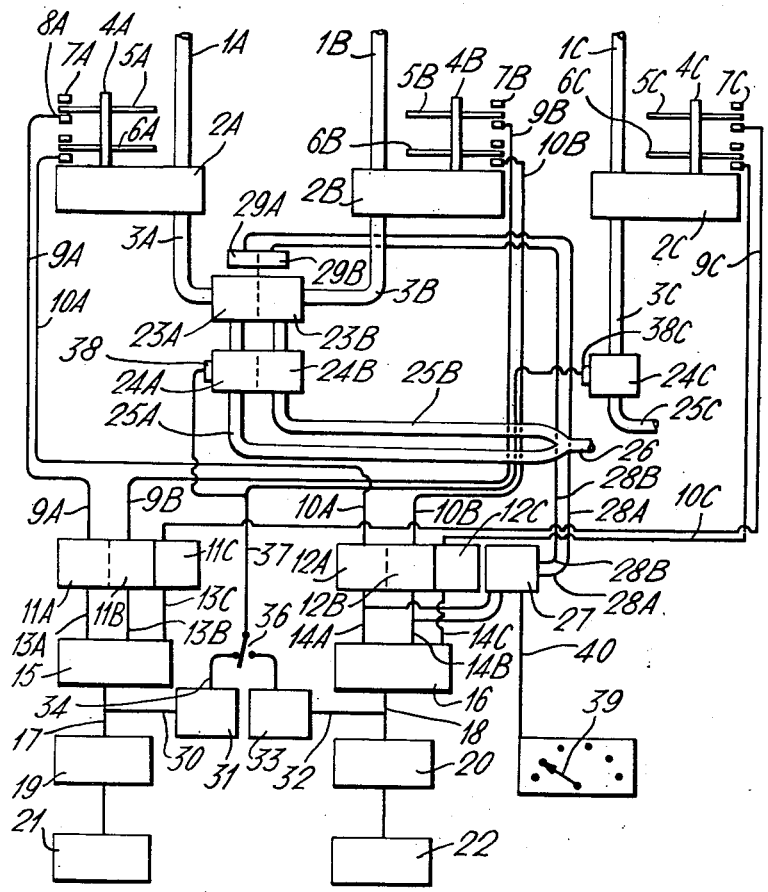

The invention is illustrated by but limited with reference to the FIGURES 1–3, 4A, 4B, 5–19, 19A, 19B, 19C and 20–23 of the accompanying drawings wherein FIGURE 1 is a block diagram of the electrical and electronic circuitry in the pulse generation, pulse summation, pre-set and read-out stages of the system described with reference to FIGURE 23, FIGURES 2, 3, 4A, 4B, 5–18 are circuit diagrams of the sections of the circuitry represented in block form by FIGURE 1, FIGURES 19A, 19B, 19C and 20 are representations of terminal boards whereby connections may be made from one section of the circuitry to another, FIGURE 19 is a block diagram showing the manner in which connections are made between the boards disclosed with reference to FIGURES 19A, 19B and 19C, FIGURE 21 is a circuit diagram of the blend control stage of the system, and FIGURE 22 is a schematic flow diagram of a system comprising fluid metering, pulse generation, pulse summation, blend control, pre-set and read-out stages, adapted to dispense either of two selected products, or a number of blends of fixed proportions of the two products, or a third selected product.

The invention is further illustrated by Tables 1–24 which supply information by means of which, when taken in conjunction with the reference numerals on FIGURES 1–20, a lead may be traced from one section of the circuitry to another, and hence by means of which a complete circuit diagram may be constructed, the functions of the components of which will be apparent to those skilled in the art.

Figure 23:
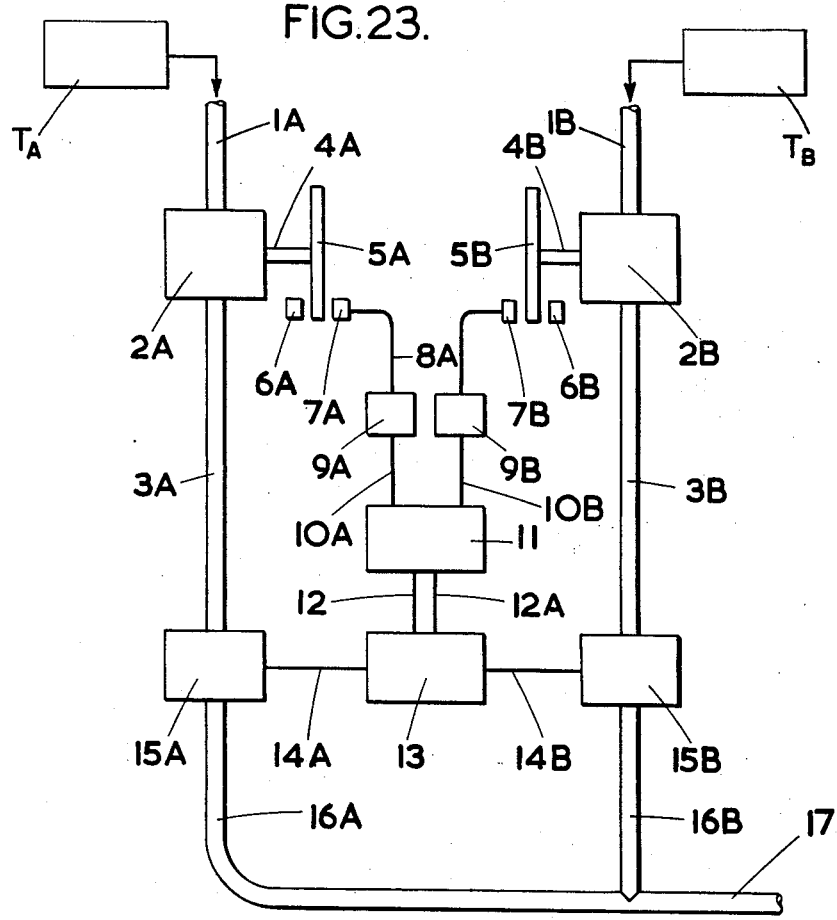
Figure 24:
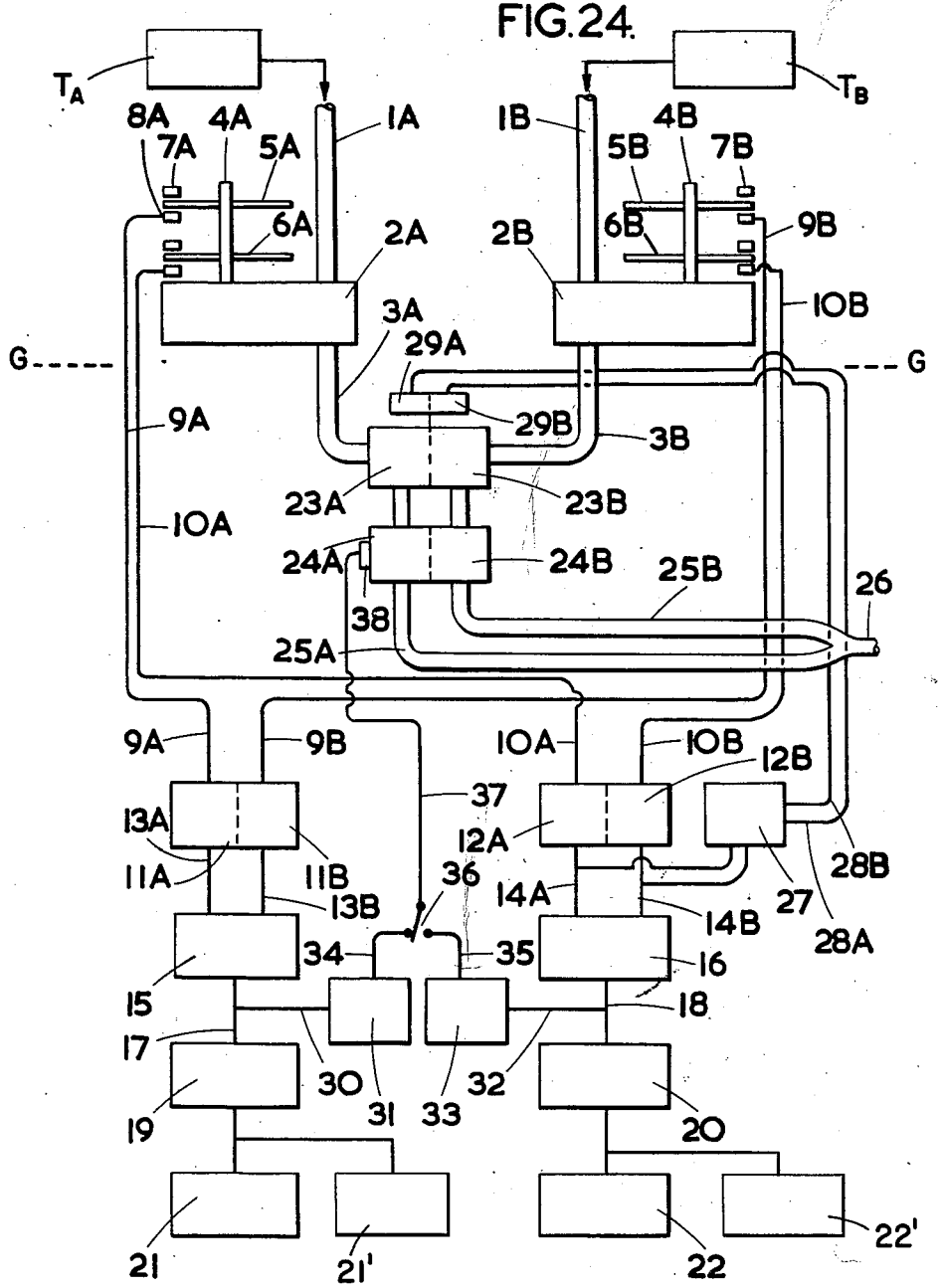
Figure 25:
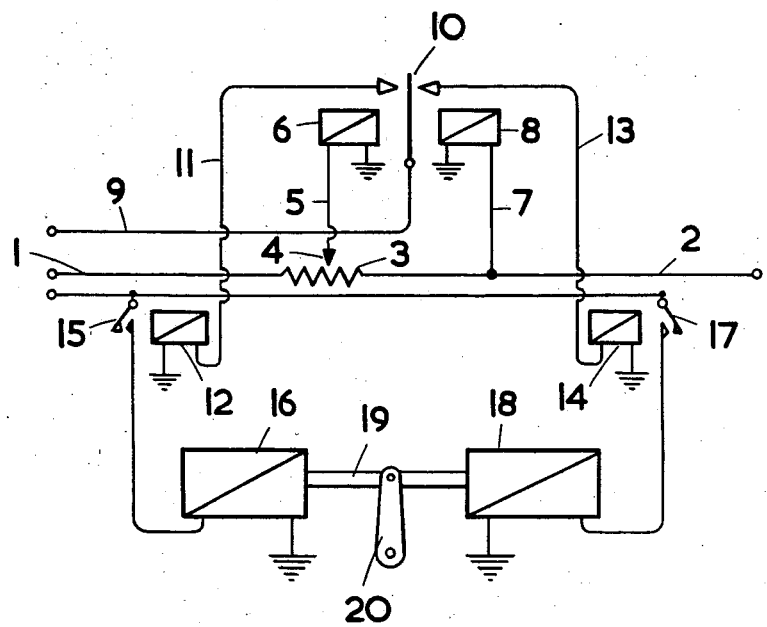

The invention is further illustrated by but not limited with reference to FIGURES 23, 24 and 25 of the accompanying drawings, corresponding to FIGURES 1, 2 and 3 respectively of the drawings accompanying the Provisional Specification wherein FIGURE 23 is a schematic flow diagram of a system comprising fluid metering, pulse generation and pulse summation stages, FIGURE 24 is a schematic flow diagram of a system comprising fluid metering, pulse generation, pulse summation, blend control, pre-set and read-out stages and FIGURE 25 is a circuit diagram of a form of balance circuit, suitable for use as circuit 11 with reference to FIGURE 23 or circuit 27 with reference to FIGURE 24.

With reference to FIGURE 23:

A liquid product supply line 1A in communication with a storage tank $T_A$ is connected to flow meter 2A, preferably including a pump, take-off being by line 3A. Metering output is by rotating shaft 4A, connected to disc 5A which has alternate sectors of transparent and opaque material forming a ring near its periphery. A light source 6A is set to cast a beam through the transparent sectors, the beam being received by photoelectric cell 7A which, as a result of the interruption of the light beam during rotation of disc 5A, gives rise to a pulse train in lead 8A. This pulse train is fed to pulse conversion circuit 9A and a continuous signal of variable current strength obtained thereby is fed by lead 10A to balance circuit 11.

Similarly, a second liquid product supply line to 1B in communication with storage tank $T_B$ is used in a duplicate system to provide a second continuous signal of variable current strength in line 10B which is also fed to the balance circuit 11.

From circuit 11 signals are taken by leads 12 and 12A to valve actuating unit 13 connected by a mechanical or electrical linkage 14A and 14B to control valves 15A and 15B. Take-off from valves 15A and 15B is by lines 16A and 16B having a common outlet 17.

In operation two fluid streams will pass, respectively, through lines 1A and 3A, and through 1B and 3B, the continuous signals generated in consequence passed through circuit 11. If the ratio of the current strength of the signals differs from a pre-set value, a signal will be passed by lead 12 to the actuating unit 13 which will operate valves 15A and/or 15B in a manner which adjusts the flow through the meters towards the valves which give the required flow ratio.

With reference to FIGURE 24:

A liquid product supply line 1A in communication with storage tank $T_A$ is connected to flow meter 2A, which preferably includes a pump, take-off being by line 3A. The tank and meter with pump preferably comprise a section of the system disposed below ground level as symbolized by the dash line G—G. Metering output is by rotating shaft 4A, connected to discs 5A and 6A which each have alternate sectors of transparent and opaque material forming a ring near the periphery. A light source 7A is set to cast a beam through the transparent sector of disc 5A, the beam being received by photoelectric cell 8A which, as a result of the interruption of the light beam during rotation of disc 5a, gives rise to a pulse train in lead 9A. Similarly disc 6A gives rise to a pulse train in lead 10A.

Similarly, a second liquid product supply line 1B in communication with tank $T_B$ is connected to meter 2B which preferably includes a pump and which is used in a duplicate system to provide pulse trains in leads 9B and 10B.

Pulse trains carried by leads 9A, 9B, 10A and 10B are modified by pulse shaping circuits 11A, 11B, 12A and 12B respectively to rectangular wave form, output being by leads 13A, 13B, 14A and 14B respectively.

Pulse trains carried by leads 13A and 13B are added in pulse summating unit 15; similarly pulse trains carried by leads 14A and 14B are added in unit 16.

The output pulse trains of units 15 and 16 are carried by leads 17 and 18 and are related to the flow of liquid product through meters 2A and 2B as follows:

Discs 6A and 6B are provided with a number of alternate sectors of transparent and opaque material such that the output signal carried by lead 18 has a convenient pulse frequency for subsequent use in a pulse counter. Disc 5A has a number of sectors which provides a pulse train in lead 13A which is a measure of the total price of the liquid passing through meter 2A; disc 5B has, in general, a different number of sectors proportional to the different price of the liquid passing through meter 2B and thus gives rise to a pulse train in lead 13B which is a measure of the total price of the liquid passing through meter 2B. The summated pulse train in lead 17 is a measure of the total price of the two liquids which have passed through the meters.

The pulse trains in leads 17 and 18 are passed to pulse counters 19 and 20 respectively which are connected, usually electrically or mechanically, to read-out indicators 21 and 22 respectively and, advantageously to similar portable indicators 21' and 22', respectively. In some applications the latter may be provided with their own pulse counters.

Control of blending is effected as follows:

Liquid products passing by lines 3A and 3B are fed to ganged valves 23A and 23B, thence by ganged throttling valves 24A and 24B to lines 25A and 25B and are blended in line 26.

From leads 14A and 14B signal pulse trains are fed to balance circuit 27 in which the signal pulses are converted to continuous variable strength signals and an output signal generated in one or other of lines 28A or 28B according to which input signal is over strength in relation to the other; pre-setting of the balance circuit permits a desired ratio to constitute the criterion. Leads 28A and 28B are connected to electromagnetic valve operating units 29A and 29B connected to ganged valves 23A and 23B respectively. Signals carried by leads 28A and 28B maintain the blend in line 26 at the previously selected blending ratio.

Pre-setting for the delivery of a pre-determined value or volume of total liquid product is effected as follows:

The pulse train carried by lead 17 is also fed by line 30 to pre-set unit 31; similarly the pulse train carried by lead 18 is fed by line 32 to pre-set unit 33.

Output from units 31 and 33 is taken by lines 34 and 35 to switch 36 which enables pre-setting to be based either on value or volume, according to the unit in circuit. Units 31 and 33 comprise trigger circuits and are activated to give an output signal or receipt of a pre-set number of pulses.

The output signal is carried from switch 36 by lead 37 to valve actuating unit 38 which on receipt of the signal shuts down ganged valves 24A and 24B.

Operation is as follows:

Balance unit 27 is set to the required blending ratio and, if pre-set of total supply is required, either unit 31 is set for total price or unit 33 is set for total volume, switch 36 being set accordingly. Valves 24A and 24B are opened and liquid product thereby allowed to pass through the meters to blend at 26, a continuous read-out of total price and volume being given by indicators 21 and 22.

Blending ratio is continuously maintained in adjustment by unit 27 acting on valves 23A and 23B. When the required quantity of liquid product has been passed through the meters, valves 24A and 24B will close.

Between operations, read-out digits will be re-set to zero.

The system is particularly suitable for the sale of liquid fuels for use by motor vehicles at roadside supply or service stations.

The invention is further illustrated but not limited with reference to FIGURE 25 which is a circuit diagram of a form of balance circuit, suitable for use as circuit 11 with reference to FIGURE 23 or circuit 27 with reference to FIGURE 24.

With reference to FIGURE 25:

Control signals are fed into leads 1 and 2, connected across potentiometer 3. A movable contact 4 is connected by lead 5 to solenoid 6; lead 7 is connected to solenoid 8. Current is fed by lead 9 to differential relay arm 10 which completes circuit either through lead 11 and solenoid 12 or through lead 13 and solenoid 14. Relay arm 15 completes a power circuit to actuating solenoid 16; similarly arm 17 completes a power circuit to actuating solenoid 18. Solenoids 16 and 18 control arm 19 and lever 20.

With reference to FIGURE 22:

The system is as described with reference to FIG. 24, with the addition of a third set of units, designated by the suffix "C," identical to those described with reference to FIG. 24, with the exception that a blend control valve is not provided.

A selector switch 39 connected by means of a lead 40 to the blend control circuit 27 is provided whereby the system may be selected to dispense either the first liquid product or the second liquid product or any one of a number of preselected blends of the first and second liquid products or the third liquid product.

With reference to FIGURES 1–3, 4A, 4B, 5–18 and 22:

Pulses from price transmitter 5A and/or price transmitter 5B or price transmitter 5C, according to the setting of selector switch 39, are fed into pulse shaping circuits 60 and/or 61 or 62, respectively, from which they emerge in rectangular wave form. Pulse shaping circuits 60 and 62 are disclosed in diagrammatic form by FIG. 2, pulse shaping circuit 61 by FIG 3.

When selected blend of two selected fluid products is dispensed, pulses are transmitted concurrently from transmitters 5A and 5B.

Shaped pulses from circuits 60 and/or 61 or 62 are then channelled to electronic scanning unit 202 disclosed by FIG. 4A in which an electronic switch scans each pulse channel at a rate which is approximately six times as fast as the maximum pulse input frequency. A signal is generated by scanning unit 202 if and only if a channel is scanned at least twice and a shaped pulse is detected on each occasion. Spurious pulses are therefore not recognized by the scanning unit and do not give rise to signals therefrom.

Figure 5:
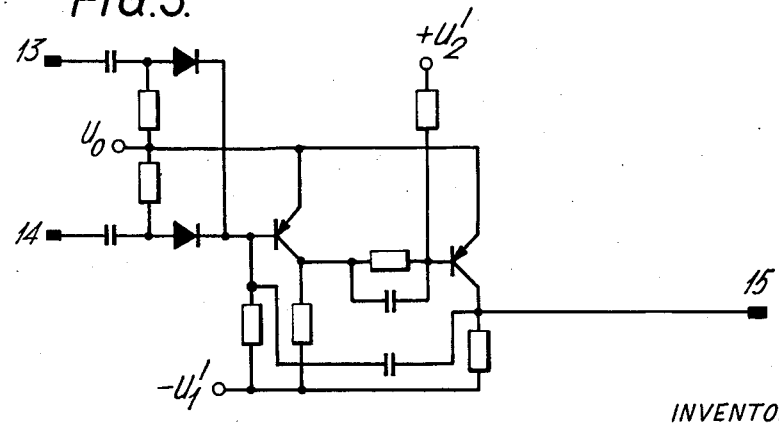

Signals from the scanning unit 202 are then fed into integrating unit 201 disclosed by FIG. 5, which integrates and transmits signals received from the scanning unit to pulse counter 19. If two signals are fed simultaneously to integrating unit 15, an extra pulse is triggered off therein and two signals are fed to counter 19.

Figure 6:
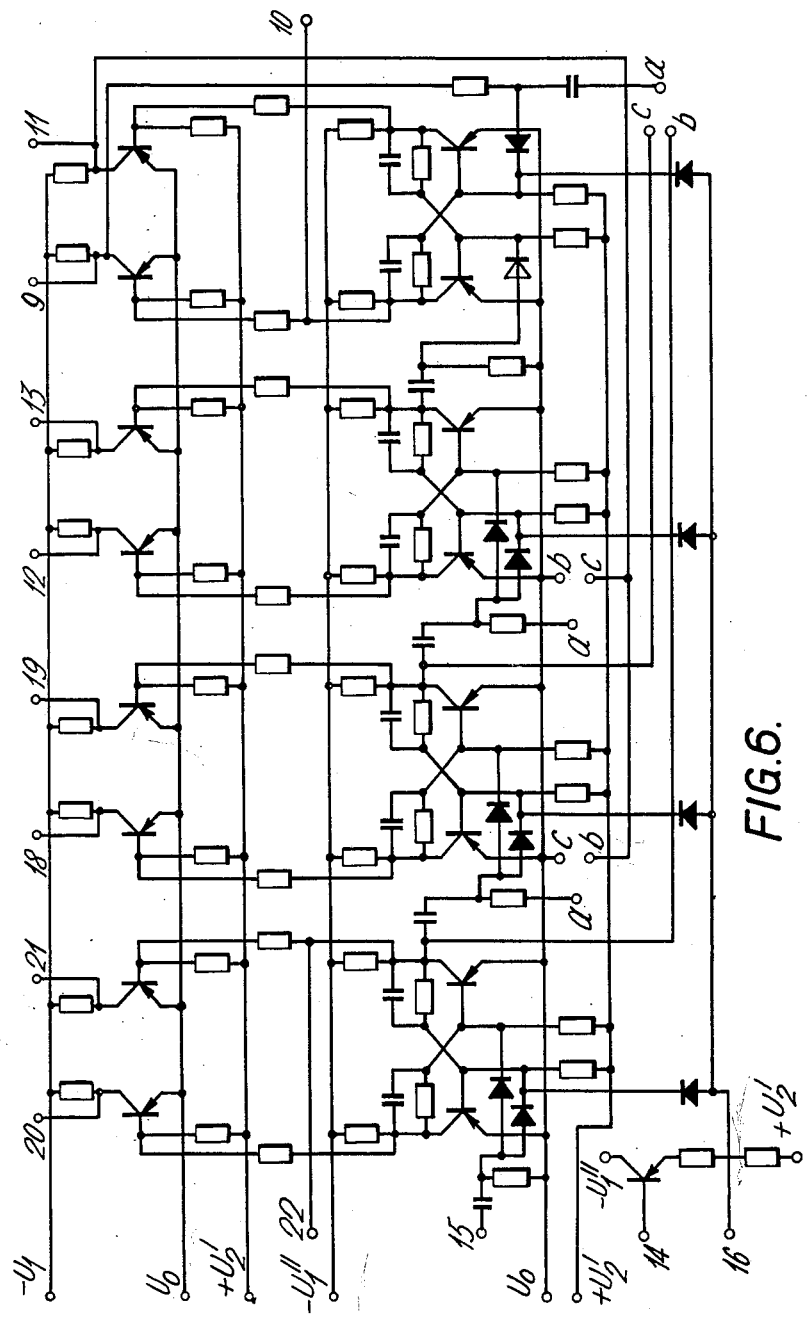

Counter 19 is of the four decade digital type and comprises four circuits 204, each disclosed by FIG. 6. Output signals from each circuit of counter 19 are then amplified by means of a drum controller, comprising four circuits 205, each disclosed by FIG. 7, and then supplied to read-out system 21 disclosed by German patent application No. 630,827 IX 42p.

Figure 8:
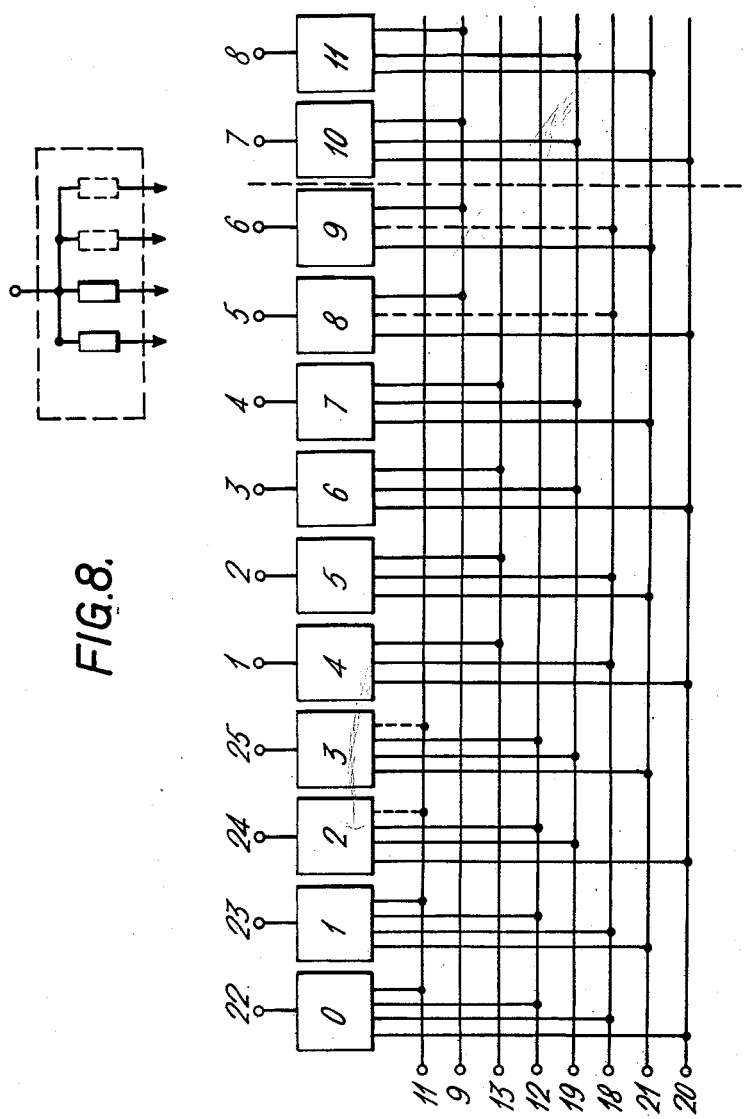
Figure 9:
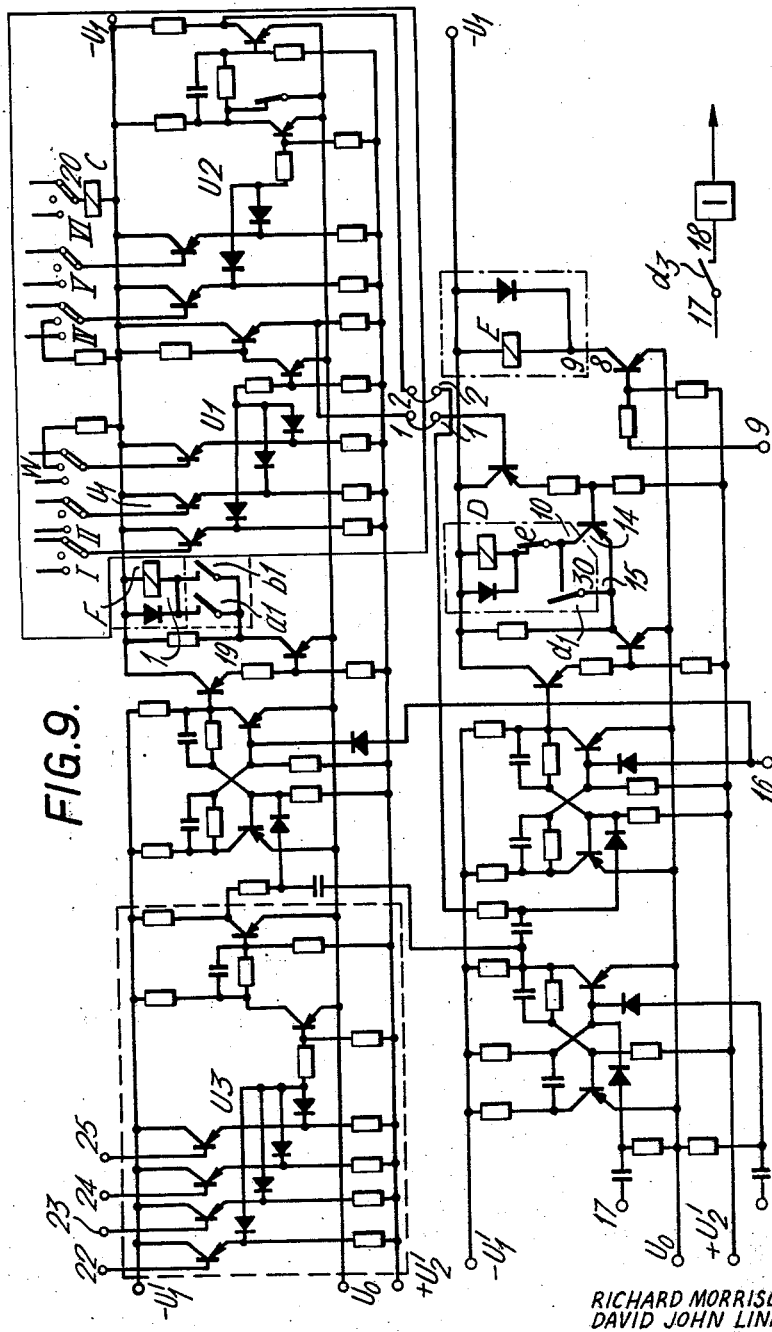

Output signals from each circuit of the counter are also fed by means of distributor, each distributor comprising four tracks, each track disclosed by FIG. 8, into pre-set selector switch unit 31, 32, disclosed by FIG. 12.

The circuits and units described to this point constitute apparatus for measuring and presetting the value of the product which may be dispensed by the system. The system also comprises a second set of circuits and units, for measuring and presetting the volume of the product which may be dispensed from the system, identical to the units so far described; these are identified in FIG. 1 by the addition of the suffix "A" to the reference numerals. At a pre-determined number of pulses before delivery of the pre-set value or volume of fuel, corresponding to a pre-determined total number of pulses, a first signal pre-set unit 207, disclosed by FIG. 12, is energized. Unit 207 in turn energizes a pre-set trip solenoid or solenoids controlling shut off valves 24A and/or 24B or 24C which thereupon partially close, being prevented from closing completely by a latch. Unit 207 also triggers second signal pre-set unit 20, disclosed by FIG. 13, which then responds to pulses received subsequently until the time required to receive the number of pulses required to complete the pre-determined total number of pulses equals the time required to close the valve or valves completely, whereupon the latch is released and the valve is allowed to close completely.

Screening circuits 210, and 211, disclosed by FIGS. 10 and 11, are provided.

A system of hold-in relays 110 is disclosed by FIG. 14.

Figure 15:
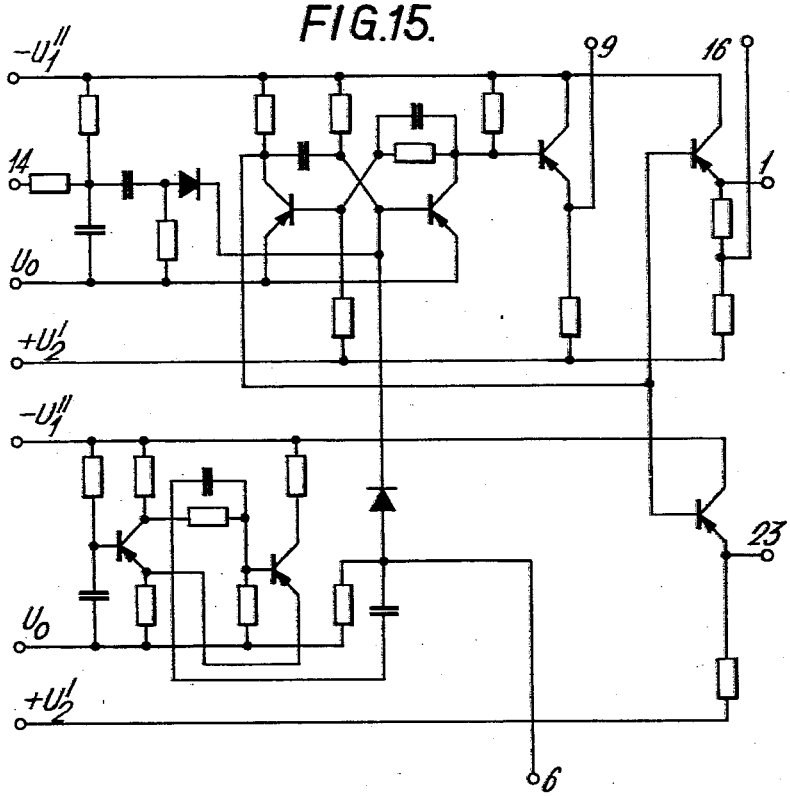

Start up unit 206, disclosed by FIG. 15, is provided which, when an appropriate nozzle is removed from its holder, runs the drums of read-out systems 21 and 22 to zero, energizes valve actuating mechanism 38 or 38C and switches itself off again.

Figure 16:
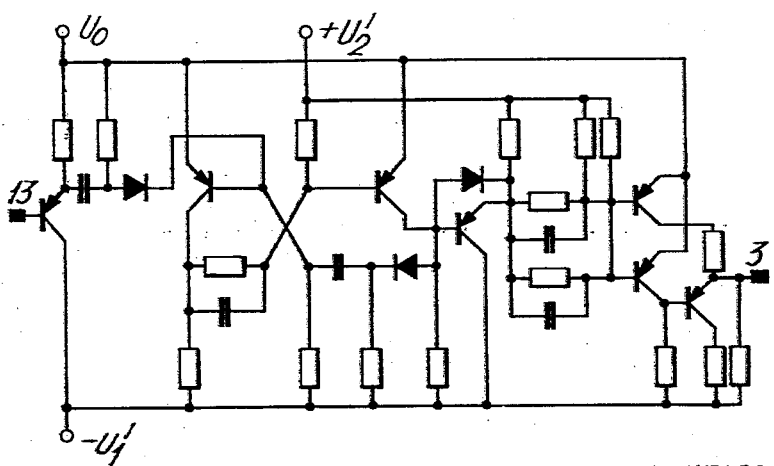
Figure 17:
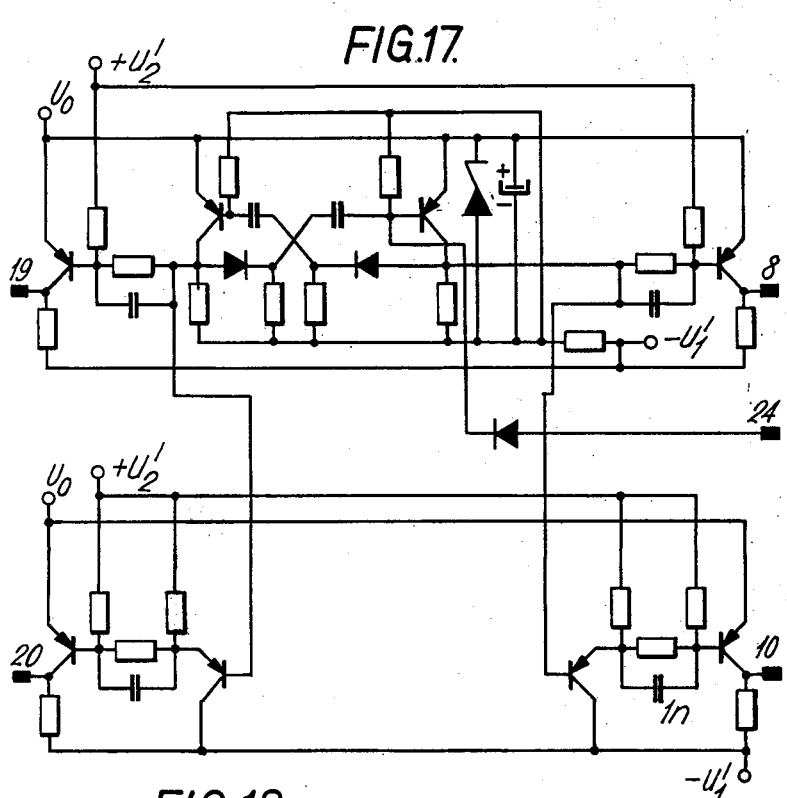

Pulses from the first and second selected product channels of scanning unit 202A are also fed to blend control unit 44 which comprises pulse forming circuits 212, 213 and multivibrator 203 disclosed by FIGURES 16, 18 and 17 respectively.

The circuitry hereinbefore described is printed on cards. With reference to FIGURES 19, 19A, 19B, 19C, 20 and 22.

Socket panel 45 is provided into which the terminal sockets of circuits 205A, 204A, 209A, 210A, 202A, 203, 211, 210 are fitted as shown. Socket panel 46 is provided into which the terminal sockets of circuits 205A, 204A, 209A, 210A, 202A, 206, 207, 208 and 110 are fitted as shown.

Connections are made by means of the terminal board 47 to read-out systems 21 and 22 and by means of sockets 48, 49 and 50 to the pre-selector switch wiring circuit disclosed by FIG. 20.

With reference to FIGURES 21 and 22:

Signals from the pulse forming circuits 212 and 213 are fed into transformers 51 and 52. The outputs from transformers 51 and 52 are fed into opposite arms of a bridge circuit, the point of balance of which is selected by means of selector switch 39.

Double pole switch 53 controlling the actuating mechanism of ganged blend valves 23A and 23B, is actuated when the bridge is unbalanced by current flowing in the bridge, the direction of flow of the current controlling the direction of throw of the switch and thereby direction of the actuating mechanism of the valves.

I. CONNECTIONS FROM THE TERMINAL BOARD 47 TO THE SOCKET PANEL 45

Table 1

| Card 209A | | Terminal Board 47 | | | |
|---|---|---|---|---|---|
| Number | Pin | 1 Decade | 2 Decade | 3 Decade | 4 Decade |
| 0 | 22 | 2E | 2F | 2G | 2H |
| 1 | 23 | 3E | 3F | 3G | 3H |
| 2 | 24 | 4E | 4F | 4G | 4H |
| 3 | 25 | 5E | 5F | 5G | 5H |
| 4 | 1 | 6E | 6F | 6G | 6H |
| 5 | 2 | 7E | 7F | 7G | 7H |
| 6 | 3 | 8E | 8F | 8G | 8H |
| 7 | 4 | 9E | 9F | 9G | 9H |
| 8 | 5 | 10E | 10F | 10G | 10H |
| 9 | 6 | 11E | 11F | 11G | 11H |
| 10 | 7 | 12E | 12F | 12G | 12H |
| 11 | 8 | 13E | 13F | 13G | 13H |

Table 2

[Card 205A]

| Symbol | Pin | 1 Decade | 2 Decade | 3 Decade | 4 Decade |
|---|---|---|---|---|---|
| Contact 1 | 24 | 2J | 4J | 9J | 11J |
| Contact 2 | 19 | 3J | 5J | 10J | 12J |
| Contact 3 | 17 | 2K | 4K | 9K | 11K |
| Contact 4 | 10 | 3K | 5K | 10K | 12K |
| Magnet | 3 | 1J | 6J | 8J | 13J |

Table 3

[Card 201A]

| Symbol | Pin | Board 47 | Symbol | Pin | Board 47 |
|---|---|---|---|---|---|
| Switch | 1 | 8A | Anode | 18 | 11B |
| Cathode | 2 | 9A | Do | 23 | 13B |
| Anode | 5 | 9B | Switch | 24 | 12A |
| Switch | 16 | 10A | Cathode | 25 | 13A |
| Cathode | 17 | 11A | | | |

Table 4

[Card 204A]

| Symbol | Pin | Board 47 |
|---|---|---|
| Zero-reset | 14 | 12L |

Table 5

[Card 203A]

| Pin | Board 47 | Pin | Board 47 |
|---|---|---|---|
| 3 | 7A | 19 | 10L |
| 6 | 6A | 20 | 11L |
| 8 | 8L | 24 | 7K |
| 10 | 9L | | |

Table 6

[Card 211A]

| Symbol | Pin | Board 47 |
|---|---|---|
| $-U_1'$ | 4 | 7L |

Table 7

[Card 210A]

| Symbol | Pin | Board 47 |
|---|---|---|
| $-U_2''$ | 14 | 6L |
| $+U_2$ | 26 | 2L |
| $+U_2'$ | 27 | 5L |
| $U_0$ | 28 | 3L |
| $-U_1$ | 29 | 4L |

II. CONNECTIONS FROM THE TERMINAL BOARD 47 TO THE SOCKET PANEL 46

Table 8

| Card 209 | | Terminal Board 47 | | | |
|---|---|---|---|---|---|
| Number | Pin | 1 Decade | 2 Decade | 3 Decade | 4 Decade |
| 0 | 22 | 25E | 25F | 25G | 25H |
| 1 | 23 | 24E | 24F | 24G | 24H |
| 2 | 24 | 23E | 23F | 23G | 23H |
| 3 | 25 | 22E | 22F | 22G | 22H |
| 4 | 1 | 21E | 21F | 21G | 21H |
| 5 | 2 | 20E | 20F | 20G | 20H |
| 6 | 3 | 19E | 19F | 19G | 19H |
| 7 | 4 | 18E | 18F | 18G | 18H |
| 8 | 5 | 17E | 17F | 17G | 17H |
| 9 | 6 | 16E | 16F | 16G | 16H |
| 10 | 7 | 15E | 15F | 15G | 15H |
| 11 | 8 | 14E | 14F | 14G | 14H |

Table 9
[Card 205]

| Symbol | Pin | 1 Decade | 2 Decade | 3 Decade | 4 Decade |
|---|---|---|---|---|---|
| Contact 1 | 24 | 25J | 23J | 18J | 16J |
| Contact 2 | 19 | 24J | 22J | 17J | 15J |
| Contact 3 | 17 | 25K | 23K | 18K | 16K |
| Contact 4 | 10 | 24K | 22K | 17K | 15K |
| Magnet | 3 | 26J | 21J | 19J | 14J |

Table 10
[Card 201]

| Symbol | Pin | Board 47 | Symbol | Pin | Board 47 |
|---|---|---|---|---|---|
| Switch | 1 | 19A | Anode | 18 | 16B |
| Cathode | 2 | 18A | Do | 23 | 14B |
| Anode | 5 | 18B | Switch | 24 | 15A |
| Switch | 16 | 17A | Cathode | 25 | 14A |
| Cathode | 17 | 16A | | | |

Table 11
[Card 207]

| Pin | Board 47 |
|---|---|
| 19 | 24A |
| 22 | 26E |
| 23 | 26F |
| 24 | 26G |
| 25 | 26H |

Table 12
[Card 202]

| Pin | Board 47 |
|---|---|
| 8 | 19L |
| 10 | 18L |
| 19 | 17L |
| 20 | 16L |

Table 13
[Card 110]

| Symbol | Pin | Board 47 |
|---|---|---|
| $a_1b_1$ | 1 | 24B |
| f-Cont | 3 | 22A |
| f-Cont | 4 | 22B |
| $-U_1$ | 14 | 23L |
| $d_4$-Cont | 15 | 14C |
| $d_4$-Cont | 16 | 15C |
| $d_3$-Cont. m | 18 | 23A |
| $d_3$-Test | 19 | 16C |
| C-Rel. VII | 20 | 26D |
| C-Cont | 25 | 21A |
| C-Cont | 26 | 21B |
| $d_3$-Cont | 17 | 23B |
| $U_0$ | 27 | 24L |

Table 14
[Card 206]

| Pin | Board 47 |
|---|---|
| 1 | 15L |
| 6 | 20K |
| 14 | 20A |

Table 15
[Card 208]

| Symbol | Pin | Board 47 |
|---|---|---|
| I | 24 | 14D |
| II | 23 | 15D |
| III | 22 | 16D |
| IV | 19 | 17D |
| V | 18 | 18D |
| W | 13 | 21D |
| U | 12 | 22D |
| $+U_2$ | 26 | 25L |
| $+U_2'$ | 27 | 22L |
| $-U_1'$ | 30 | 20L |
| $-U_1''$ | 31 | 21L |

III. CONNECTIONS ACROSS TERMINAL BOARD 47

Table 16

| Symbol | Volume | | Board 47 | Price | |
|---|---|---|---|---|---|
| | Card | Pin | | Pin | Card |
| $+U_2$ | 210 | 26 | 2L–25L | 26 | 207b |
| $U_0$ | 210 | 28 | 3L–24L | 27 | 110b |
| $-U_1$ | 210 | 29 | 4L–23L | 14 | 110b |
| $+U_2'$ | 210 | 27 | 5L–22L | 27 | 207b |
| $-U_1''$ | 210 | 14 | 6L–21L | 31 | 207b |
| $-U_1'$ | 211 | 4 | 7L–20L | 30 | 207b |
| Multivibrator | 203 | 8 | 8L–19L | 8 | 202 |
| Do | 203 | 10 | 9L–18L | 10 | 202 |
| Do | 203 | 19 | 10L–17L | 19 | 202 |
| Do | 203 | 20 | 11L–16L | 20 | 202 |
| Multiv-pulse | 203 | 24 | 7K–20K | 6 | 206 |
| Zero-reset | 204 | 14 | 12L–15L | 1 | 206 |

IV. CONNECTIONS FROM THE TERMINAL BOARD 47 TO THE READ-OUT SYSTEM

Table 17
[Volume Read-Out 22]

| Symbol | Pin | 1 Decade | 2 Decade | 3 Decade | 4 Decade |
|---|---|---|---|---|---|
| Contact 1 | A | 2J | 4J | 9J | 11J |
| Contact 2 | B | 3J | 5J | 10J | 12J |
| Contact 3 | C | 2K | 4K | 9K | 11K |
| Contact 4 | D | 3K | 5K | 10K | 12K |
| $U_0$ | F | 1G | 1G | 1G | 1G |
| Magnet | E | 1J | 6J | 8J | 13J |
| $-U_1$ magnet | H | 1F | 1F | 1F | 1F |

Table 18
[Price Read-Out 21]

| Symbol | Pin | 1 Decade | 2 Decade | 3 Decade | 4 Decade |
|---|---|---|---|---|---|
| Contact 1 | A | 25J | 23J | 18J | 16J |
| Contact 2 | B | 24J | 22J | 17J | 15J |
| Contact 3 | C | 25K | 23K | 18K | 16K |
| Contact 4 | D | 24K | 22K | 17K | 15K |
| $U_0$ | F | 1G | 1G | 1G | 1G |
| Magnet | E | 26J | 21J | 19J | 14J |
| $-U_1$ magnet | H | 1F | 1F | 1F | 1F |

Table 19
[Motor]

| Symbol | Pin | Board 47 |
|---|---|---|
| 220 volt | D | 1C |
| Do | H | 2C |

V. CONNECTIONS FROM THE TERMINAL BOARD 47 THROUGH THE SOCKETS 48, 49 AND 50 TO THE SWITCHES

Table 20

| Board 47 | Socket | Pin | Switch | Level | Contact |
|---|---|---|---|---|---|
| 2E | 48 | A | 3 | 1 | 0 |
| 3E | 48 | B | 3 | 1 | 1 |
| 4E | 48 | C | 3 | 1 | 2 |
| 5E | 48 | D | 3 | 1 | 3 |
| 6E | 48 | E | 3 | 1 | 4 |
| 7E | 48 | F | 3 | 1 | 5 |
| 8E | 48 | H | 3 | 1 | 6 |
| 9E | 48 | J | 3 | 1 | 7 |
| 10E | 48 | K | 3 | 1 | 8 |
| 11E | 48 | L | 3 | 1 | 9 |
| 2F | 48 | M | | | |
| 7F | 48 | T | 5 | 3 | 1 |
| 11F | 48 | X | 5 | 4 | 1 |
| 4G | 48 | AA | | | |
| 6G | 48 | CC | 1 | 2 | 1;3;5... |
| 11G | 48 | JJ | 1 | 2 | 2;4;6... |
| 2H | 48 | KK | 1 | 1 | 1;2 |
| 3H | 48 | LL | 1 | 1 | 3;4 |
| 4H | 48 | MM | 1 | 1 | 5;6 |
| 5H | 48 | NN | 1 | 1 | 7;8 |
| 6H | 49 | A | 1 | 1 | 9;10 |
| 7H | 49 | B | 1 | 1 | 11;12 |
| 8H | 49 | C | 1 | 1 | 13;14 |
| 9H | 49 | D | 1 | 1 | 15;16 |
| 10H | 49 | E | 1 | 1 | 17;18 |
| 11H | 49 | F | 1 | 1 | 19 |
| 20E | 49 | H | 4 | 1 | 5 |
| 21E | 49 | J | 4 | 1 | 4 |
| 22E | 49 | K | 4 | 1 | 3 |
| 23E | 49 | L | 4 | 1 | 2 |
| 24E | 49 | M | 4 | 1 | 1 |
| 25E | 49 | N | 4 | 1 | 0 |
| 26D | 49 | P | 5 | 6 | M |
| 18D | 49 | T | 5 | 5 | M |
| 22D | 49 | U | 5 | 4 | 2 |
| 17D | 49 | V | 5 | 4 | M |
| 21D | 49 | W | 5 | 3 | 2 |
| 16D | 49 | Y | 5 | 3 | M |
| 15D | 49 | Z | 5 | 2 | M |
| 14D | 49 | AA | 5 | 1 | M |
| 26H | 49 | BB | 1 | 1 | 1 |
| 26G | 49 | CC | | | |
| 24D | 49 | DD | 1 | 3 | M |
| 26F | 49 | EE | | | |
| 26E | 49 | FF | 3 | 1 | 0 |
| 3C | 49 | MM | 5 | 7 | M |
| 4C | 49 | NN | | | Lamps |
| 19E | 50 | NN | 4 | 1 | 6 |
| 18E | 50 | MM | 4 | 1 | 7 |
| 17E | 50 | LL | 4 | 1 | 8 |
| 16E | 50 | KK | 4 | 1 | 9 |
| 20F | 50 | CC | 5 | 1 | 3 |
| 16F | 50 | Y | 5 | 4 | 3 |
| 21G | 50 | T | 2 | 2 | 1;3;5... |
| 16G | 50 | M | 2 | 2 | 2;4;6... |
| 25H | 50 | L | 2 | 1 | 1;2 |
| 24H | 50 | K | 2 | 1 | 3;4 |
| 23H | 50 | J | 2 | 1 | 5;6 |
| 22H | 50 | H | 2 | 1 | 7;8 |
| 21H | 50 | F | 2 | 1 | 9;10 |
| 20H | 50 | E | 2 | 1 | 11;12 |
| 19H | 50 | D | 2 | 1 | 13;14 |
| 18H | 50 | C | 2 | 1 | 15;16 |
| 17H | 50 | B | 2 | 1 | 17;18 |
| 16H | 50 | A | 2 | 1 | 19 |

VI. BRIDGE CONNECTIONS ACROSS THE SOCKETS

Table 21

| Socket | Pin | to | Socket | Pin |
|---|---|---|---|---|
| 48 | M | ------ | 49 | EE |
| 48 | AA | ------ | 49 | CC |

VII. CONNECTIONS BETWEEN THE SWITCHES

Table 22

| Switch | Level | Contact | Switch | Level | Contact |
|---|---|---|---|---|---|
| 1 | 1 | M | 5 | 1 | 1 |
| 1 | 2 | M | 5 | 2 | 1 |
| 1 | 3 | M | 5 | 3 | 0 |
| 1 | 3 | O | 5 | 6 | 1 |
| 2 | 1 | M | 5 | 3 | 3 |
| 2 | 2 | M | 5 | 2 | 3 |
| 2 | 3 | M | 5 | 6 | 3 |
| 3 | 1 | M | 5 | 5 | 1 |
| 4 | 1 | M | 5 | 5 | 3 |

VIII. CONNECTION TO THE TERMINAL BOARD 47

Table 23

| Symbol | Volume | | | Price | | |
|---|---|---|---|---|---|---|
| | Premium | Diesel | Regular | Premium | Diesel | Regular |
| Cathode | 13A | 11A | 9A | 14A | 16A | 18A |
| Anode | 13B | 11B | 9B | 14B | 16B | 18B |
| Selector switch | 12A | 10A | 8A | 15A | 17A | 19A |
| $-U_1'$ | 12B | 10B | 8B | 15B | 17B | 19B |

Table 24

| Symbol | Board 47 | Symbol | Board 47 |
|---|---|---|---|
| 220 volt | 1A | Zero reset $U_0$ | 20B |
| Do | 1A | C-contact | 21A |
| Lamp | 3A | C-contact | 21B |
| Do | 4A | F-contact | 22A |
| $-U_1$ | 26A | F-contact | 22B |
| $U_0$ | 26B | $a_1b_1$-contact | 24A |
| $+U_2$ | 26C | $a_1b_1$-contact | 24B |
| Blend control "S" | 6A | $d_3$-contact | 23B |
| Blend control $U_0$ | 6B | $d_3$-Centre contact | 23A |
| Blend control "B" | 7A | $d_3$-Test contact | 16C |
| Blend control $U_0$ | 7B | $d_4$-Contact | 14C |
| Zero reset "G" | 20A | $d_4$-Contact | 15C |

We claim:

1. A fluid blending system comprising two meters, each meter (a) being adapted for use in association with a fluid stream to measure a property of the stream, (b) when in use being in association with a different fluid stream and (c) each meter being connected to a variable pulse rate electrical signal transmitter whereby there is provided a discrete signal train, the train during a given period being characteristic of the value of the property measured by the meter; said system also comprising a pulse rate responsive electrical circuit adapted to receive simultaneously a separate discrete signal train derived from each of the transmitters and adapted to provide an output electrical signal when the ratio of the values of the properties measured by the meters differs from a pre-determined ratio; said system also comprising an electro-mechanically operated flow control unit, adapted to be connected into the fluid streams and adapted to respond to signals derived from said electrical circuit to maintain the ratio of the values of the properties as measured by the meters at said pre-determined ratio.

2. A fluid blending system comprising two meters, each meter (a) being adapted for use in association with a fluid stream to measure a property of the stream (b) when in use being in association with a different fluid stream and (c) each meter being connected to an electrical variable frequency pulse signal transmitter whereby there is provided a signal train, the signal train overall being characteristic of the integral of the property measured, said integral being taken over a period of operation of the meter; said system also comprising an electrical circuit having pulse rate responsive means and a plurality of separate input circuits adapted to respectively receive simultaneously a discrete signal train derived from each of the transmitters, said electrical circuit being adapted to provide an output electrical signal when the ratio of the integrals of the values of the properties measured by the meters differs from a pre-determined ratio; said system also comprising an electro-mechanically operated flow control unit, adapted to be connected into the fluid streams and adapted to respond to signals derived from said electrical circuit to maintain the ratio of the integrals of the values of the properties as measured by the meter at said pre-determined ratio.

3. A fluid blending system according to claim 1 wherein said signal train provided by each electrical signal generator is a pulse train.

4. A fluid blending system according to claim 3 comprising a pulse shaping circuit adapted to shape said pulse train to rectangular wave form.

5. A fluid blending system according to claim 3 comprising means whereby each pulse train is converted into a continuous signal of variable current strength.

6. A fluid blending system according to claim 5 wherein said electrical circuit comprises a potentiometer adapted to be fed by each continuous signal of variable current strength, one at each end, and adapted to balance about a plurality of points, selection means being provided to select a balance point in accordance with a desired ratio in the strengths of the continuous signals of variable current strength, in use, one of said continuous signals of variable current strength and a take-off signal from the potentiometer being fed to a differential electromagnetic device adapted to provide a signal, according to the relative strengths of current of the two signals fed to said device.

7. A fluid blending system according to claim 6 wherein said device comprises a solenoid adapted to receive one of said input signals of variable current strength, a solenoid adapted to receive said take-off signal from the potentiometer and a single relay arm operable by the solenoids, the relay arm being adapted to complete either of two circuits adapted to transmit output signals according to variations in the ratio of the strengths of the input signals and the setting of the selection means.

8. A fluid blending system according to claim 1 wherein said flow control unit comprises a pair of ganged valves.

9. A liquid product dispensing unit comprising a fluid blending system according to claim 1, a read-out system and a set of storage tanks, each tank being provided to contain a different liquid product and having associated therewith a pump and one of said meters.

10. A liquid product dispensing unit according to claim 9 wherein said storage tanks, pumps and meters are located below ground level, as hereinbefore defined, and said read-out system is located above ground level.

11. A liquid product dispensing unit according to claim 10 wherein said read-out system is portable.

12. A liquid product dispensing unit according to claim 11, for use in dispensing fuel to vehicles, comprising two read-out systems adapted to operate electrically in parallel, a first system comprised in a fixed unit, located to provide indication to operating personnel and a second system comprised in a portable unit adapted for location to provide indication at the driving position of a vehicle.

References Cited in the file of this patent

UNITED STATES PATENTS

| | | |
|---|---|---|
| 2,319,444 | Crosby | May 18, 1943 |
| 2,898,040 | Steele | Aug. 4, 1959 |
| 2,931,538 | Young et al. | Apr. 5, 1960 |
| 2,998,187 | Wollar | Aug. 29, 1961 |
| 3,033,421 | Henderson | May 8, 1962 |
| 3,036,585 | Shawhan | May 29, 1962 |

UNITED STATES PATENT OFFICE
CERTIFICATE OF CORRECTION

April 28, 1964

Patent No. 3,130,869

Richard Morrison Phillips et al.

It is hereby certified that error appears in the above numbered patent requiring correction and that the said Letters Patent should read as corrected below.

Column 14, Table 24, second column, line 2 thereof, for "1A" read -- 2A --.

Signed and sealed this 22nd day of September 1964.

(SEAL)
Attest:

ERNEST W. SWIDER
Attesting Officer

EDWARD J. BRENNER
Commissioner of Patents